(12) United States Patent
Lee et al.

(10) Patent No.: US 12,423,877 B2
(45) Date of Patent: Sep. 23, 2025

(54) POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

(71) Applicant: LG ELECTRONICS INC., Seoul (KR)

(72) Inventors: Sooyeon Lee, Seoul (KR); Hyunmook Oh, Seoul (KR); Hyejung Hur, Seoul (KR); Yousun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/287,839

(22) PCT Filed: Apr. 20, 2022

(86) PCT No.: PCT/KR2022/005668
§ 371 (c)(1),
(2) Date: Oct. 20, 2023

(87) PCT Pub. No.: WO2022/225333
PCT Pub. Date: Oct. 27, 2022

(65) Prior Publication Data
US 2024/0185467 A1    Jun. 6, 2024

(30) Foreign Application Priority Data
Apr. 21, 2021  (KR) .................. 10-2021-0051458

(51) Int. Cl.
*G06T 9/00* (2006.01)

(52) U.S. Cl.
CPC .................................. *G06T 9/001* (2013.01)

(58) Field of Classification Search
None
See application file for complete search history.

(56) References Cited

U.S. PATENT DOCUMENTS

| | | |
|---|---|---|
| 2020/0258262 A1 | 8/2020 | Lasserre et al. |
| 2021/0029383 A1 | 1/2021 | Tourapis et al. |
| 2022/0108487 A1* | 4/2022 | Cao ............... H04N 19/597 |

FOREIGN PATENT DOCUMENTS

| | | |
|---|---|---|
| WO | WO 2020/123469 | 6/2020 |
| WO | WO 2021/029511 | 2/2021 |

OTHER PUBLICATIONS

Convener (Afnor, France), "G-PCC codec description v9, MPEG 3D Graphics Coding," ISO/IEC JTC 1/SC 29/WG 7, N0011, Virtual meeting, Oct. 2020, 148 pages.

(Continued)

*Primary Examiner* — Xiaolan Xu
(74) *Attorney, Agent, or Firm* — Fish & Richardson P.C.

(57) ABSTRACT

A point cloud data transmission method according to embodiments comprises the steps of: encoding geometry data including positions of points of point cloud data; encoding, on the basis of the geometry data, attribute data including attribute values of the points of the point cloud data; and transmitting the encoded geometry data, the encoded attribute data, and signaling information, wherein, in the step of encoding the geometry data, the geometry data can be compressed on the basis of the correlation between frames and the distribution of the points.

13 Claims, 28 Drawing Sheets

(56) References Cited

OTHER PUBLICATIONS

Convenor (Jisc, Japan), "G-PCC codec description v8," ISO/IEC JTC 1/SC 29/WG 11, N19525, Virtual meeting, Jul. 2020, 140 pages.
Extended European Search Report in European Appln. No. 22792032.9, mailed on Jun. 13, 2024, 8 pages.
International Search Report and Written Opinion in International Appln. No. PCT/KR2022/005668, mailed on Aug. 4, 2022, 15 pages (with English translation).
Lasserre et al., "On motion compensation for geometry coding in TM3," Blackberry, m42521, MPEG 122, San Diego, Apr. 2018, 26 pages.
Sultani et al., "Kinect 3D Point Cloud Live Video Streaming," in Procedia Computer Science, Apr. 2015, 65:125-132.

\* cited by examiner

FIG. 6
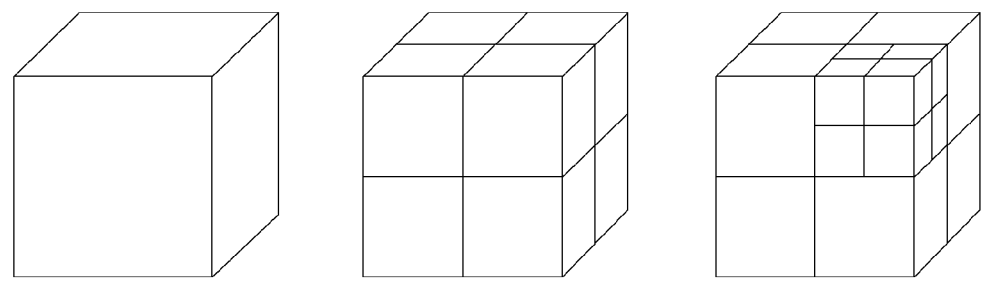
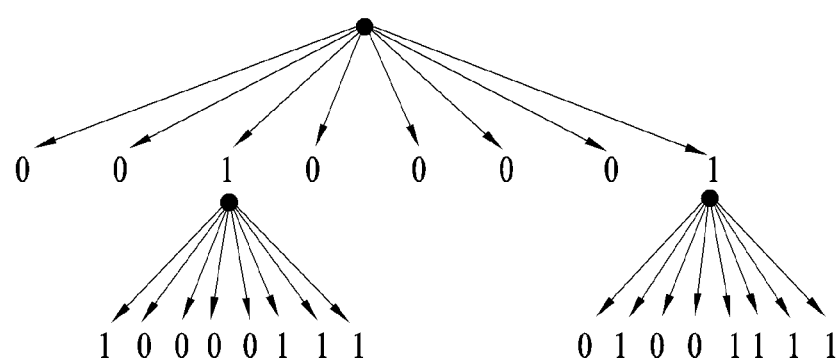

FIG. 7
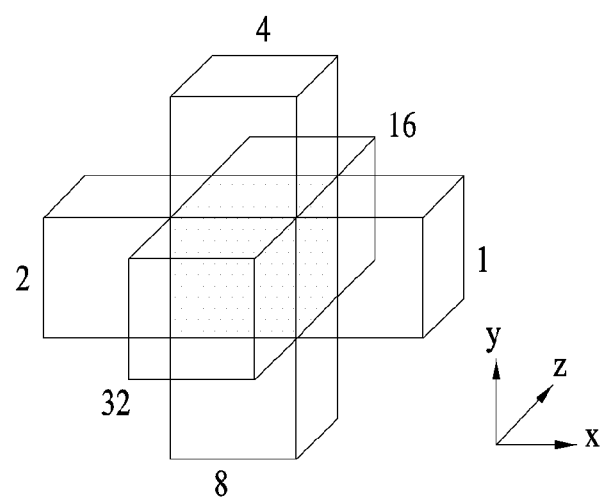
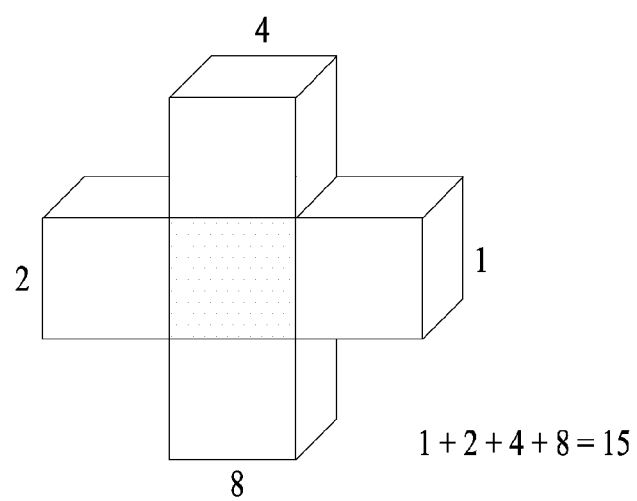
1 + 2 + 4 + 8 = 15

FIG. 15
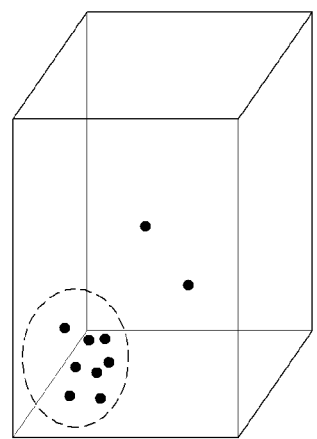
Reference frame의 search window
(a)
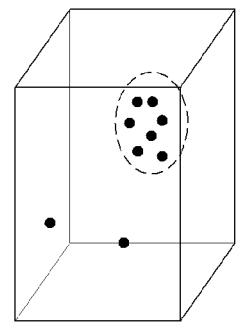
current frame의 Prediction Unit
(b)

FIG. 21

| seq_parameter_set_rbsp( ) { | Descriptor |
|---|---|
| ... | |
|   Distribute_MEMC_enable | u(1) |
| ... | |
| } | |

FIG. 22

| geometry_parameter_set( ) { | Descriptor |
|---|---|
| ... | |
| gps_Distribute_MEMC_enable | u(1) |
|   if(gps_Distribute_MEMC_enable){ | |
|   Anchor_Cal_Method | ue(v) |
|     gps_RefFrame_Threshold | ue(v) |
|   } | |
| ... | |
| } | |

FIG. 23

| geometry_data_unit( ) { | Descriptor |
|---|---|
|     geometry_data_unit_header( ) | |
|     if( geom_tree_type == 0 ) | |
|         occupancy_tree( ) | |
|     else if( geom_tree_type == 1 ) | |
|         geometry_predtree_data( ) | |
|     geometry_data_unit_footer( ) | |
| } | |

FIG. 24

| geometry_data_unit_header( ) { | Descriptor |
|---|---|
|   gsh_geometry_parameter_set_id | u(4) |
|   gsh_reserved_zero_3bits | u(3) |
|   gsh_slice_id | ue(v) |
|   slice_tag | u(v) |
|   frame_ctr_lsb | u(v) |
|   if( !entropy_continuation_enabled_flag ) { | |
|     gsh_entropy_continuation_flag | u(1) |
|     if( gsh_entropy_continuation_flag ) | |
|       gsh_prev_slice_id | ue(v) |
|   } | |
|   if( gps_gsh_box_log2_scale_present_flag ) | |
|     gsh_box_log2_scale | ue(v) |
|   gsh_box_origin_bits_minus1 | ue(v) |
|   for( k = 0; k < 3; k++ ) | |
|     gsh_box_origin_xyz[ k ] | u(v) |
|   if( geom_slice_angular_origin_present_flag ) { | |
|     gsh_angular_origin_bits_minus1 | ue(v) |
|     for( k = 0; k < 3; k++ ) | |
|       gsh_angular_origin_xyz[ k ] | s(v) |
|   } | |
|   if( geom_tree_type == 0 ) { | |
|     geom_tree_depth_minus1 | ue(v) |
|     if( geom_tree_coded_axis_list_present_flag ) | |
|       for( lvl = 0; lvl <= geom_tree_depth_minus1; lvl++ ) | |
|         for( k = 0; k < 3; k++ ) | |
|           geom_tree_coded_axis_flag[ lvl ][ k ] | u(1) |
|     gsh_entropy_stream_cnt_minus1 | ue(v) |
|   } | |
|   if( geom_scaling_enabled_flag ) { | |
|     geom_slice_qp_offset | se(v) |
|     if( geom_tree_type == 1 ) | |
|       geom_qp_offset_intvl_log2_delta | se(v) |
|   } | |
|   if( geom_tree_type == 1 ) { | |
|     for( k = 0; k < 3; k++ ) | |
|       ptn_residual_abs_log2_bits[ k ] | u(3) |
|     if( geometry_angular_enabled_flag ) | |
|       ptn_radius_min_value | ue(v) |
|   } | |
|   byte_alignment( ) | |
| } | |

FIG. 25

| geometry_data_unit_header( ) { | Descriptor |
|---|---|
| ... | |
| gbh_Distribute_MEMC_enable | u(1) |
|   if(gbh_Distribute_MEMC_enable){ | |
|   Anchor_Cal_Method | ue(v) |
|     gbh_RefFrame_Threshold | ue(v) |
|   } | |
| ... | |
| } | |

POINT CLOUD DATA TRANSMISSION DEVICE, POINT CLOUD DATA TRANSMISSION METHOD, POINT CLOUD DATA RECEPTION DEVICE, AND POINT CLOUD DATA RECEPTION METHOD

CROSS-REFERENCE TO RELATED APPLICATIONS

This application is a National Phase application under 35 U.S.C. § 371 of International Application No. PCT/KR2022/005668, filed on Apr. 20, 2022, which claims the benefit of Korean Application No. 10-2021-0051458, filed on Apr. 21, 2021, the content of which are incorporated by reference herein in their entirety.

TECHNICAL FIELD

Embodiments relate to a method and apparatus for processing point cloud content.

BACKGROUND ART

Point cloud content is content represented by a point cloud, which is a set of points belonging to a coordinate system representing a three-dimensional space (or volume). The point cloud content may express media configured in three dimensions, and is used to provide various services such as virtual reality (VR), augmented reality (AR), mixed reality (MR), extended reality (XR), and self-driving services. However, tens of thousands to hundreds of thousands of point data are required to represent point cloud content. Therefore, there is a need for a method for efficiently processing a large amount of point data.

DISCLOSURE

Technical Problem

An object of the present disclosure devised to solve the above-described problems is to provide a point cloud data transmission device, a point cloud data transmission method, a point cloud data reception device, and a point cloud data reception method for efficiently transmitting and receiving a point cloud Another object of the present disclosure is to provide a point cloud data transmission device, a point cloud data transmission method, a point cloud data reception device, and a point cloud data reception method for addressing latency and encoding/decoding complexity.

Another object of the present disclosure is to provide a point cloud data transmission device, a point cloud data transmission method, a point cloud data reception device, and a point cloud data reception method for efficiently transmitting and receiving a geometry-point cloud compression (G-PCC) bitstream.

Another object of the present disclosure is to provide a point cloud data transmission device, a point cloud data transmission method, a point cloud data reception device, and a point cloud data reception method for performing transmission/reception of point cloud data through compression by applying an octree-based coding method so as to efficiently compress the point cloud data.

Another object of the present disclosure is to provide a point cloud data transmission device, a point cloud data transmission method, a point cloud data reception device, and a point cloud data reception method that may increase compression efficiency of geometry information by performing motion estimation and compensation in consideration of a distribution of points in compressing geometry information based on an octree.

Objects of the present disclosure are not limited to the aforementioned objects, and other objects of the present disclosure which are not mentioned above will become apparent to those having ordinary skill in the art upon examination of the following description.

Technical Solution

The object of the present disclosure can be achieved by providing a method of transmitting point cloud data. The method may include encoding geometry data containing positions of points of point cloud data, encoding attribute data containing attribute values of the points of the point cloud data based on the geometry data, and transmitting the encoded geometry data, the encoded attribute data, and signaling information. The encoding of the geometry data may include compressing the geometry data based on a correlation between frames and a distribution of the points.

In one embodiment, the encoding of the geometry data may include acquiring first reference position information based on points included in a prediction unit to be encoded in a current frame, selecting, based on the first reference position information, first points for motion estimation from among points included in the prediction unit, acquiring second reference position information based on points included in a search window of a reference frame, selecting, based on the second reference position information, second points for motion estimation from among the points included in the search window; estimating a motion vector based on the first points and the second points, and performing motion compensation based on the motion vector.

In one embodiment, the first reference position information may be a mean of the points included in the prediction unit, and the second reference position information may be a mean of the points included in the search window.

In one embodiment, the first reference position information may be a median of the points included in the prediction unit, and the second reference position information may be a median of the points included in the search window:

In one embodiment, the selecting of the first points may include selecting, from among the points included in the prediction unit, points within a first range from the first reference position information as the first points.

In one embodiment, the selecting of the second points may include selecting, from among the points included in the search window; points within a second range from the second reference position information as the second points.

In one embodiment, the estimating of the motion vector may include acquiring first representative position information based on the first points, acquiring second representative position information based on the second points, and estimating a difference between the first representative position information and the second representative position information as the motion vector.

In another aspect of the present disclosure, provided herein is a device for transmitting point cloud data. The device may include a geometry encoder configured to encode geometry data containing positions of points of point cloud data, an attribute encoder configured to encode attribute data containing attribute values of the points of the point cloud data based on the geometry data, and a transmitter configured to transmit the encoded geometry data, the encoded attribute data, and signaling information, wherein the geometry encoder may compress the geometry data based on a correlation between frames and a distribution of the points.

In one embodiment, the geometry encoder may include a first reference position information acquirer configured to acquire first reference position information based on points included in a prediction unit to be encoded in a current frame, a first selector configured to select, based on the first reference position information, first points for motion estimation from among points included in the prediction unit, a second reference position information acquirer configured to acquire second reference position information based on points included in a search window of a reference frame, a second selector configured to select, based on the second reference position information, second points for motion estimation from among the points included in the search window, a motion estimator configured to estimate a motion vector based on the first points and the second points, and a motion compensator configured to perform motion compensation based on the motion vector.

In one embodiment, the first reference position information may be a mean of the points included in the prediction unit, and the second reference position information may be a mean of the points included in the search window.

In one embodiment, the first reference position information may be a median of the points included in the prediction unit, and the second reference position information may be a median of the points included in the search window.

In one embodiment, the first selector may select, from among the points included in the prediction unit, points within a first range from the first reference position information as the first points.

In one embodiment, the second selector may select, from among the points included in the search window, points within a second range from the second reference position information as the second points.

In one embodiment, the motion estimator may be configured to acquire first representative position information based on the first points, acquire second representative position information based on the second points, and estimate a difference between the first representative position information and the second representative position information as the motion vector.

In another aspect of the present disclosure, provided herein is a method of receiving point cloud data. The method may include receiving geometry data containing compressed positions of points, attribute data containing compressed attribute values of the points, and signaling information, decoding the geometry data based on the signaling information, decoding the attribute data based on the signaling information and the decoded geometry data, and rendering point cloud data reconstructed from the decoded geometry data and the decoded attribute data based on the signaling information, wherein the decoding of the geometry data may include decoding the geometry data based on a correlation between frames and a distribution of the points.

In one embodiment, the decoding of the geometry data may include selecting points for motion compensation from among points included in a search window of a reference frame based on the signaling information, and performing motion compensation based on points included in a prediction unit to be decoded in a current frame and the selected points in the search window.

In one embodiment, the signaling information may include geometry compression related information, wherein the geometry compression related information may include at least motion vector information or information for point selection.

Advantageous Effects

According to embodiments, a point cloud data transmission method, a point cloud data transmission device, a point cloud data reception method, and a point cloud data reception device may provide high-quality point cloud services.

According to embodiments, a point cloud data transmission method, a point cloud data transmission device, a point cloud data reception method, and a point cloud data reception device may achieve various video codec approaches.

According to embodiments, a point cloud data transmission method, a point cloud data transmission device, a point cloud data reception method, and a point cloud data reception device may provide versatile point cloud content such as autonomous driving services.

According to embodiments, a point cloud data transmission method, a point cloud data transmission device, a point cloud data reception method, and a point cloud data reception device may perform spatially adaptive segmentation on point cloud data for independent encoding and decoding of the point cloud data, thereby providing enhanced parallel processing and scalability.

According to embodiments, a point cloud data transmission method, a point cloud data transmission device, a point cloud data reception method, and a point cloud data reception device may spatially partition point cloud data into tiles and/or slices for encoding and decoding thereof and transmit data required for the spatial partitioning, thereby improving the performance of point cloud encoding and decoding.

According to embodiments, a point cloud data transmission method, a point cloud data transmission device, a point cloud data reception method, and a point cloud data reception device may increase compression efficiency by performing motion estimation in consideration of a distribution of points in compressing geometry information based on a motion vector.

According to embodiments, a point cloud data transmission method, a point cloud data transmission device, a point cloud data reception method, and a point cloud data reception device may increase compression efficiency by performing motion estimation in consideration of a distribution of points included in a prediction unit (PU) of a current frame and/or a distribution of points included in a search window of a reference frame in compressing geometry information based on a motion vector.

According to embodiments, a point cloud data transmission method and a point cloud data transmission device may improve the prediction accuracy and reduce the complexity of prediction by checking the distribution of points included in each of the PU and the search window and performing motion vector estimation and compensation while excluding point(s) positioned outside a certain range from positions representative of the PU and the search window.

According to embodiments, a point cloud data reception method and a point cloud data reception device may improve accuracy by removing outlier point(s) among the points included in the search window of the reference frame and performing motion compensation based on signaling information including criteria for excluding outlier point(s).

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 6 illustrates an example of octree and occupancy code according to embodiments.

FIG. 7 illustrates an example of a neighbor node pattern according to embodiments.

FIGS. 15-(a) and 15-(b) illustrate an example of a distribution of points in a reference frame and a distribution of points in a current frame according to embodiments.

FIG. 21 shows an embodiment of a syntax structure of a sequence parameter set according to the present disclosure.

FIG. 22 shows an embodiment of a syntax structure of a geometry parameter set according to an embodiment of the present disclosure.

FIG. 23 shows an example syntax structure of a geometry data unit according to embodiments.

FIG. 24 shows an example syntax structure of a geometry data unit header according to embodiments.

FIG. 25 shows another example syntax structure of a geometry data unit header according to embodiments.

BEST MODE

Figure 1:
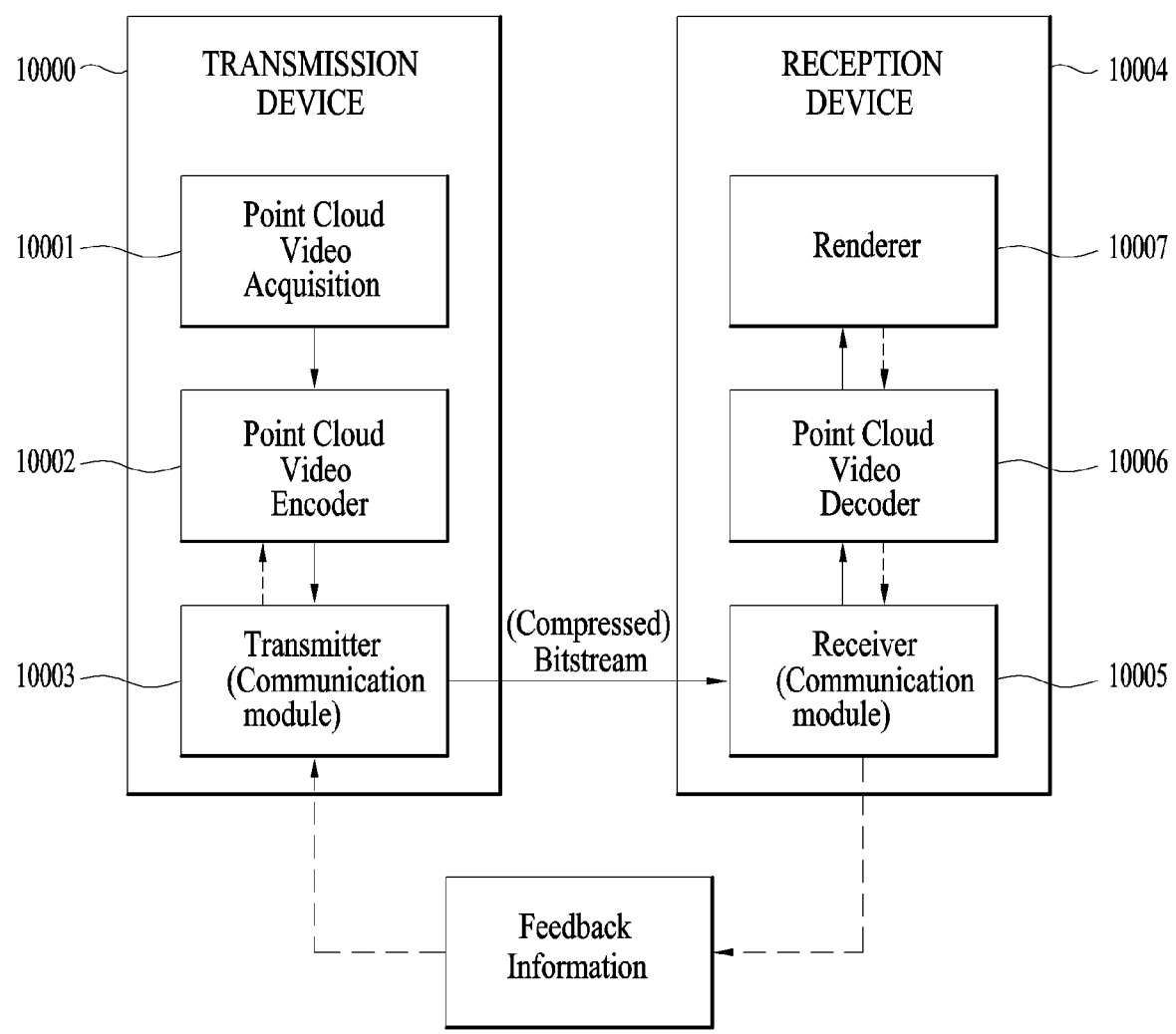
FIG. 1 illustrates an exemplary point cloud content providing system according to embodiments.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. It should be noted that the following examples are only for embodying the present disclosure and do not limit the scope of the present disclosure. What can be easily inferred by an expert in the technical field to which the present disclosure belongs from the detailed description and examples of the present disclosure is to be interpreted as being within the scope of the present disclosure.

The detailed description in this present specification should be construed in all aspects as illustrative and not restrictive. The scope of the disclosure should be determined by the appended claims and their legal equivalents, and all changes coming within the meaning and equivalency range of the appended claims are intended to be embraced therein.

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the following drawings and detailed description should not be construed as being limited to the specifically described embodiments, but should be construed as including equivalents or substitutes of the embodiments described in the drawings and detailed description.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquisition unit 10001, a point cloud video encoder 10002, and/or a transmitter (or communication module) 10003.

The point cloud video acquisition unit 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component or module) separate from the receiver 10005.

The point cloud video decoder 10006 decodes the bitstream containing the point cloud video data. The point cloud video decoder 10006 may decode the point cloud video data according to the method by which the point cloud video data is encoded (e.g., in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like).

The dotted lines in FIG. 1 represent a process of transmitting the feedback information secured by the renderer 10007. The point cloud content providing system may process (encode/decode) point cloud data based on the feedback information. Accordingly, the point cloud video decoder 10006 may perform a decoding operation based on the feedback information. The reception device 10004 may transmit the feedback information to the transmission device 10000. The transmission device 10000 (or the point cloud video encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmitting device, a transmitter, a transmission system, or the like, and the reception device 10004 may be called a decoder, a receiving device, a receiver, a reception system, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
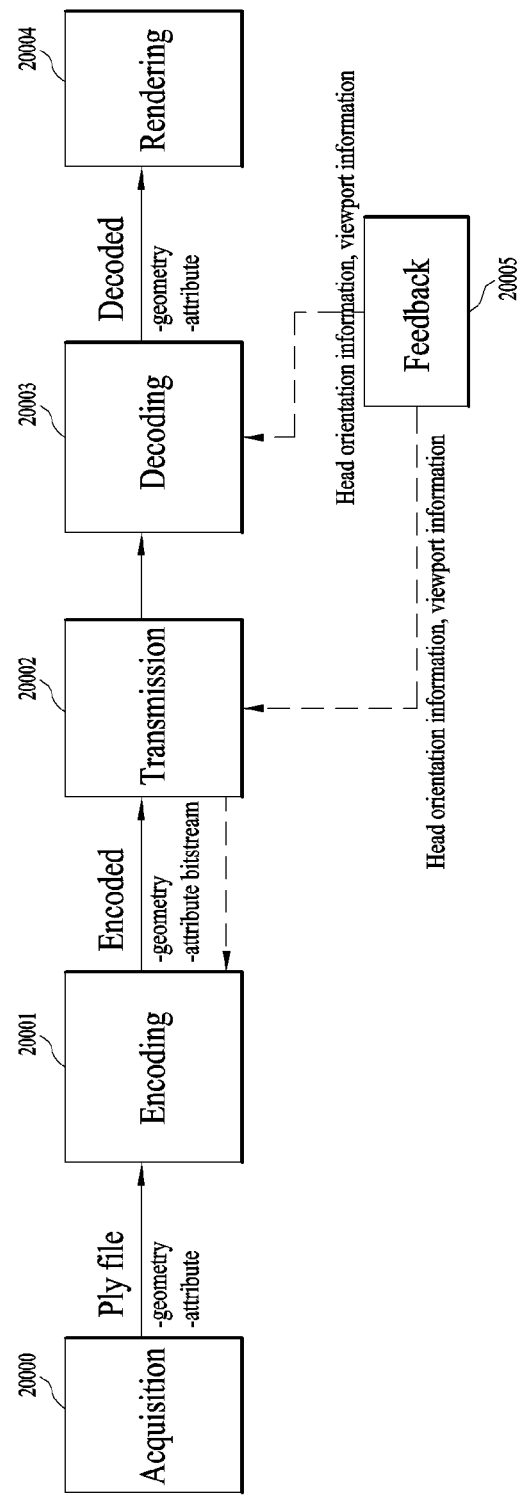
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquisition unit 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquisition unit 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
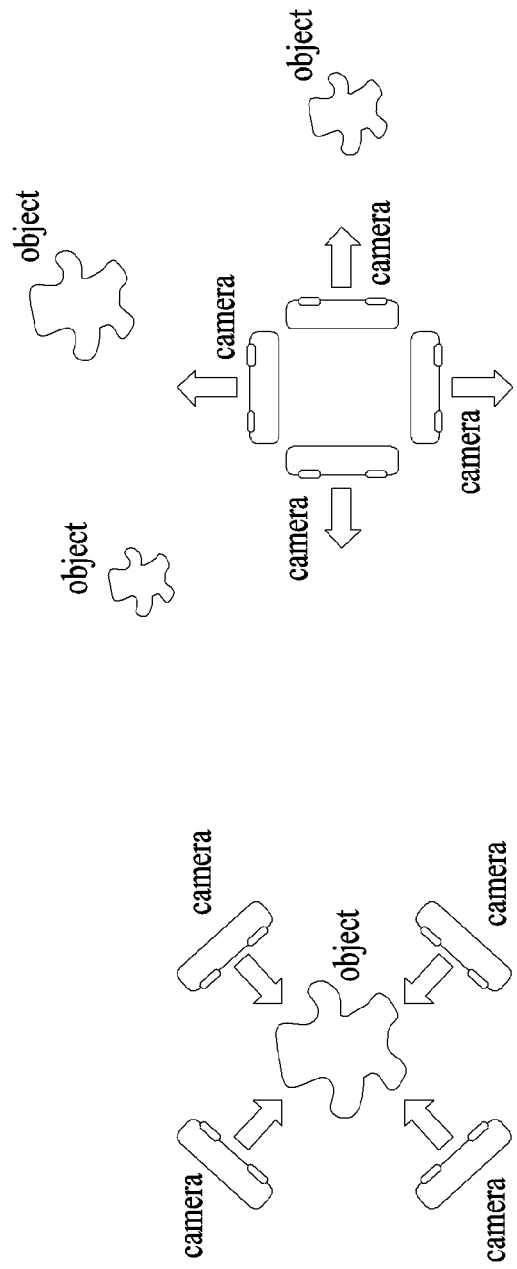
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in FIG. 3, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
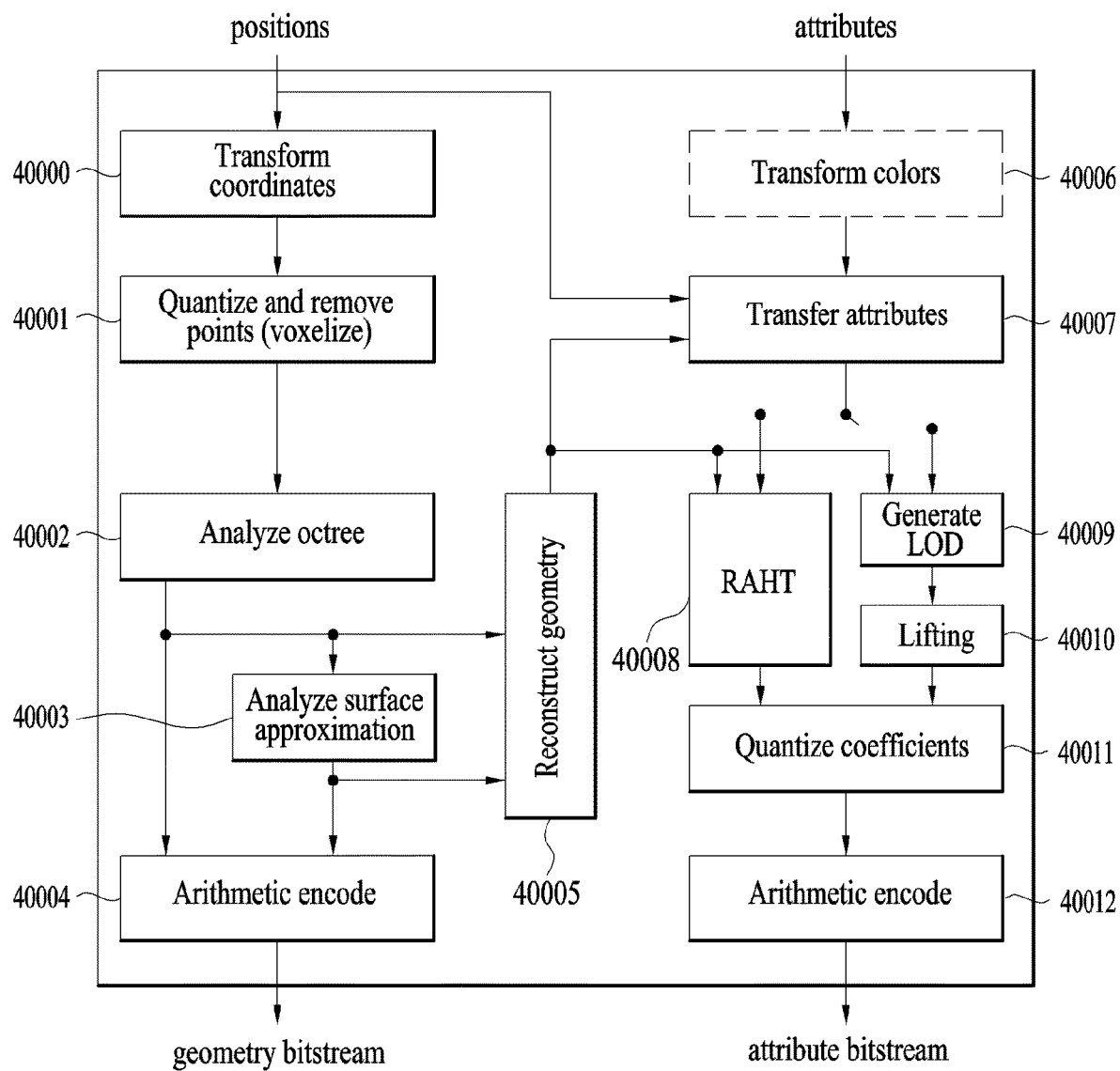
FIG. 4 illustrates an exemplary block diagram of point cloud video encoder according to embodiments.

FIG. 4 illustrates an exemplary point cloud video encoder according to embodiments.

FIG. 4 shows an example of the point cloud video encoder 10002 of FIG. 1. The point cloud video encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud video encoder may perform geometry encoding and attribute encoding. The geometry encoding is performed before the attribute encoding.

The point cloud video encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry information. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. The voxelization means a minimum unit representing position information in 3D space. Points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center point of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (e.g., from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to bit index in order of z, y, and x yields 010001000111. This value is expressed as a decimal number of 1095. That is, the Morton code value of the point having coordinates (5, 9, 1)

is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD). The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud video encoder of FIG. 4 may be implemented by hardware including one or more processors or integrated circuits configured to communicate with one or more memories included in the point cloud content providing apparatus, software, firmware, or a combination thereof. The one or more processors may perform at least one of the operations and/or functions of the elements of the point cloud video encoder of FIG. 4 described above. Additionally, the one or more processors may operate or execute a set of software programs and/or instructions for performing the operations and/or functions of the elements of the point cloud video encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
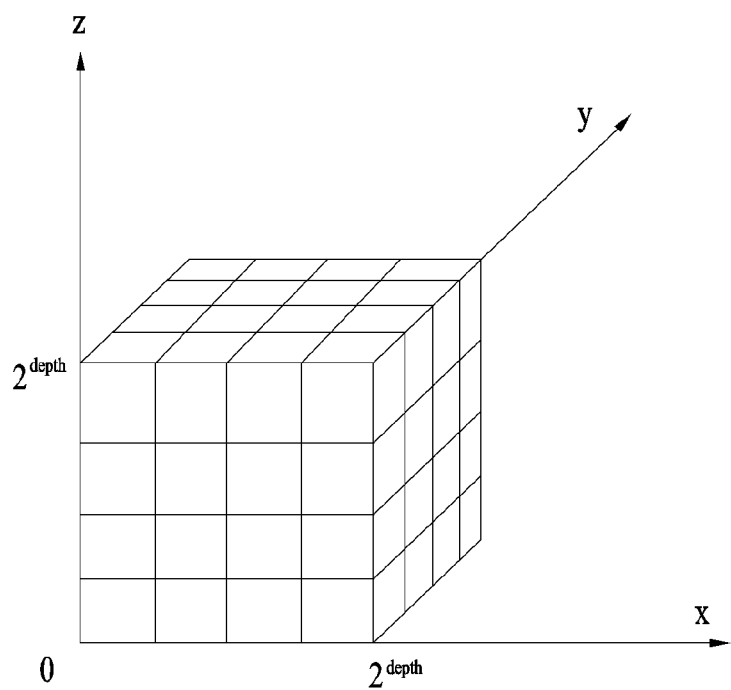
FIG. 5 illustrates an example of voxels in a 3D space according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud video encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the octree analyzer 40002 of the point cloud video encoder performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$). Here, $2^d$ may be set to a value constituting the smallest bounding box surrounding all points of the point cloud content (or point cloud video). Here, d denotes the depth of the octree. The value of d is determined in Equation 1. In Equation 1, ($x_n^{int}$, $y_n^{int}$, $z_n^{int}$) denotes the positions (or position values) of quantized points.

$$d = \mathrm{Ceil}(\mathrm{Log}\, 2(\mathrm{Max}(x_n^{int}, y_n^{int}, z_n^{int}, n=1, \ldots, N)+1)) \quad \text{[Equation 1]}$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0). Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud video encoder (e.g., the arithmetic encoder 40004) according to the embodiments may perform entropy encoding on the occupancy codes. In order to increase the compression efficiency, the point cloud video encoder may perform intra/inter-coding on the occupancy codes. The reception device (e.g., the reception device 10004 or the point cloud video decoder 10006) according to the embodiments reconstructs the octree based on the occupancy codes.

The point cloud video encoder (e.g., the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud video encoder according to the embodiments may skip voxelization and perform direct coding to directly code the positions of points included in the specific region. The coordinates of a direct coding point according to the embodiments are referred to as direct coding mode (DCM). The point cloud video encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud video decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud video encoder (or the arithmetic encoder 40004) according to the embodiments may perform entropy coding on the positions (or position values) of the points.

The point cloud video encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud video encoder according to the embodiments may specify a level at which trisoup geometry encoding is to be applied. For example, when the specific level is equal to the depth of the octree, the point cloud video encoder does not operate in the trisoup mode. In other words, the point cloud video encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud video encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud video encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed according to Equation 2 by: i) calculating the centroid value of each vertex, ii) subtracting the center value from each vertex value, and iii) estimating the sum of the squares of the values obtained by the subtraction.

[Equation 2]

$$\begin{bmatrix} \mu_x \\ \mu_y \\ \mu_z \end{bmatrix} = \frac{1}{n}\sum_{i=1}^{n}\begin{bmatrix} x_i \\ y_i \\ z_i \end{bmatrix} \quad 1$$

$$\begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2$$

$$\begin{bmatrix} \sigma_x^2 \\ \sigma_y^2 \\ \sigma_z^2 \end{bmatrix} = \sum_{i=1}^{n}\begin{bmatrix} \overline{x}_i^2 \\ \overline{y}_i^2 \\ \overline{z}_i^2 \end{bmatrix} \quad 3$$

Then, the minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan 2(bi, ai), and the vertices are ordered based on the value of θ. Table 1 below shows a combination of vertices for creating a triangle according to the number of the vertices. The vertices are ordered from 1 to n. Table 1 below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 1

Triangles formed from vertices ordered 1, . . . ,n

| n | Triangles |
|---|-----------|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |

TABLE 1-continued

Triangles formed from vertices ordered 1, . . . ,n

| n | Triangles |
|---|---|
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud video encoder according to the embodiments may voxelize the refined vertices. In addition, the point cloud video encoder may perform attribute encoding based on the voxelized positions (or position values).

FIG. 7 shows an example of a neighbor node pattern according to embodiments.

In order to increase the compression efficiency of the point cloud video, the point cloud video encoder according to the embodiments may perform entropy coding based on context adaptive arithmetic coding.

As described with reference to FIGS. 1 to 6, the point cloud content providing system or the point cloud video encoder 10002 of FIG. 1, or the point cloud video encoder or arithmetic encoder 40004 of FIG. 4 may perform entropy coding on the occupancy code immediately. In addition, the point cloud content providing system or the point cloud video encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using $2^3=8$ methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud video encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud video encoder may perform coding according to the neighbor node pattern value (for example, when the neighbor node pattern value is 63, 64 kinds of coding may be performed). According to embodiments, the point cloud video encoder may reduce coding complexity by changing a neighbor node pattern value (based on, for example, a table by which 64 is changed to 10 or 6).

Figure 8:
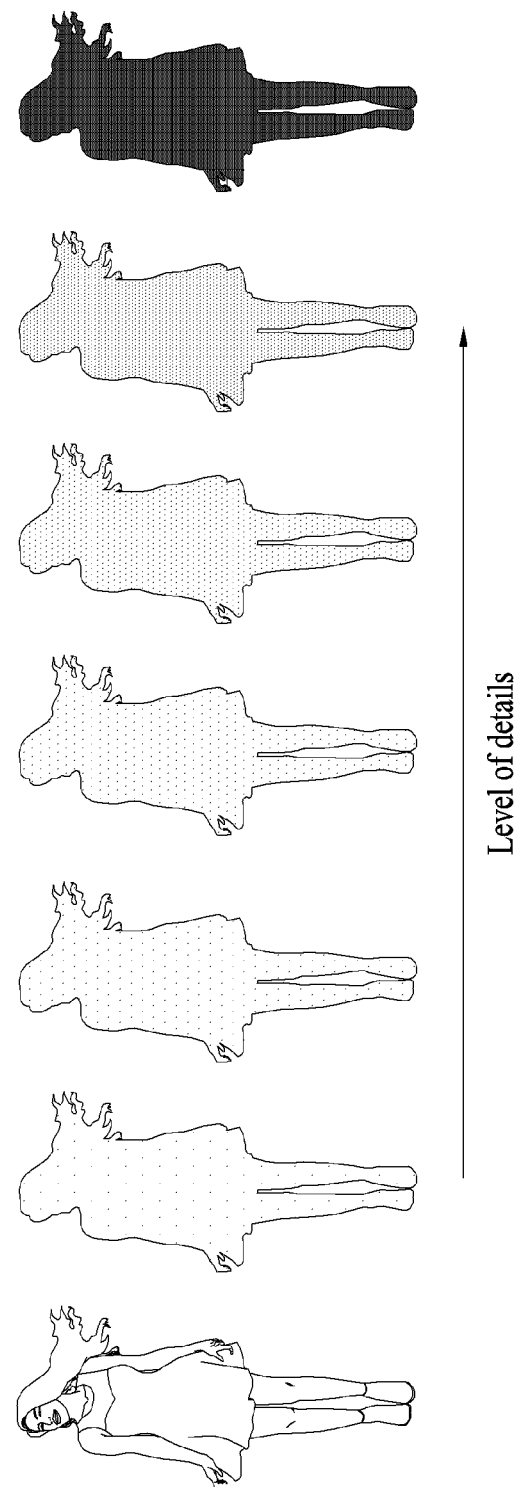
FIG. 8 illustrates an example of point configuration of a point cloud content for each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, upsampling, and voxelization. Since the attribute depends on the geometry, attribute encoding is performed based on the reconstructed geometry.

The point cloud video encoder (e.g., the LOD generator 40009) may classify (reorganize or group) points by LOD. FIG. 8 shows the point cloud content corresponding to LODs. The leftmost picture in FIG. 8 represents original point cloud content. The second picture from the left of FIG. 8 represents distribution of the points in the lowest LOD, and the rightmost picture in FIG. 8 represents distribution of the points in the highest LOD. That is, the points in the lowest LOD are sparsely distributed, and the points in the highest LOD are densely distributed. That is, as the LOD rises in the direction pointed by the arrow indicated at the bottom of FIG. 8, the space (or distance) between points is narrowed.

Figure 9:
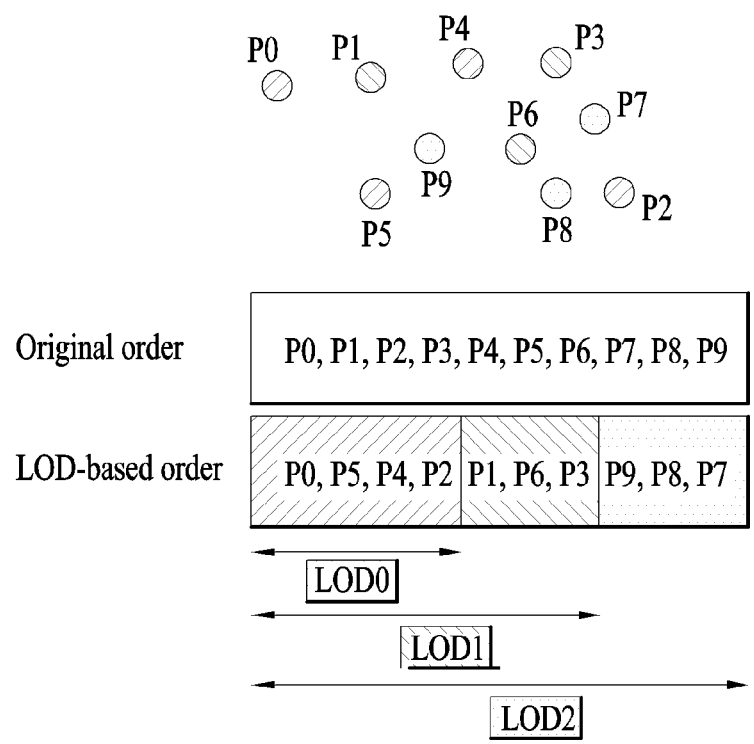
FIG. 9 illustrates an example of point configuration of a point cloud content for each LOD according to embodiments.

FIG. 9 illustrates an example of point configuration for each LOD according to embodiments.

As described with reference to FIGS. 1 to 8, the point cloud content providing system, or the point cloud video encoder (e.g., the point cloud video encoder 10002 of FIG. 1, the point cloud video encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud video encoder, but also by the point cloud video decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud video encoder according to the embodiments may perform prediction transform coding based on LOD, lifting transform coding based on LOD, and RAHT transform coding selectively or in combination.

The point cloud video encoder according to the embodiments may generate a predictor for points to perform prediction transform coding based on LOD for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud video encoder according to the embodiments (e.g., the coefficient quantizer 40011) may quantize and inversely quantize the residual of each point (which may be called residual attribute, residual attribute value, attribute prediction residual value or prediction error attribute value and so on) obtained by subtracting a predicted attribute (or attribute value) each point from the attribute (i.e., original attribute value) of each point. The quantization process performed for a residual attribute value in a transmission device is configured as shown in table 2. The inverse quantization process performed for a residual attribute value in a reception device is configured as shown in Table 3.

TABLE 2

```
int PCCQuantization(int value, int quantStep) {
if( value >=0) {
return floor(value / quantStep + 1.0 / 3.0);
} else {
return −floor(−value / quantStep + 1.0 / 3.0);
}
}
```

TABLE 3

```
int PCCInverseQuantization(int value, int quantStep) {
if( quantStep ==0) {
return value;
} else {
return value * quantStep;
}
}
```

When the predictor of each point has neighbor points, the point cloud video encoder (e.g., the arithmetic encoder 40012) according to the embodiments may perform entropy coding on the quantized and inversely quantized residual attribute values as described above. When the predictor of each point has no neighbor point, the point cloud video encoder according to the embodiments (e.g., the arithmetic encoder 40012) may perform entropy coding on the attributes of the corresponding point without performing the above-described operation.

The point cloud video encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud video encoder (e.g., coefficient quantizer 40011) according to the embodiments quantizes the predicted attribute values. In addition, the point cloud video encoder (e.g., the arithmetic encoder 40012) performs entropy coding on the quantized attribute values.

The point cloud video encoder (e.g., the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud video encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

Equation 3 below represents a RAHT transformation matrix. In Equation 3, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

[Equation 3]

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}$$

$$T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder 40012). The weights are calculated as $w_{l_{-1x,y,z}} = w_{l_{2x,y,z}} + w_{l_{2x+1,y,z}}$. The root node is created through the $g_{1_{0,0,0}}$ and $g_{1_{0,0,1}}$ as Equation 4.

[Equation 4]

$$\begin{bmatrix} gDC \\ h0_{0,0,0} \end{bmatrix} = T_{w1000\ w1001} \begin{bmatrix} g1_{0,0,0z} \\ g1_{0,0,1} \end{bmatrix}$$

The value of gDC is also quantized and subjected to entropy coding like the high-pass coefficients.

Figure 10:
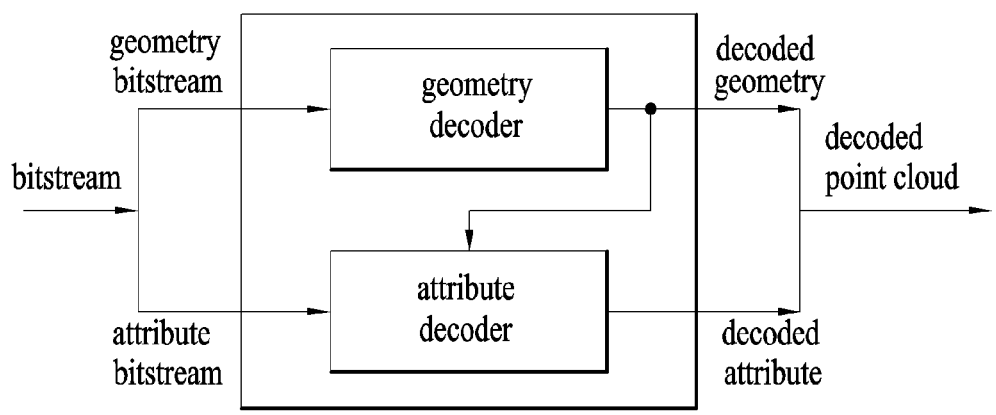
FIG. 10 illustrates an example of a block diagram of a point cloud video decoder according to embodiments.

FIG. 10 illustrates a point cloud video decoder according to embodiments.

The point cloud video decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud video decoder may receive a geometry bitstream and an attribute bitstream contained in one or more bitstreams. The point cloud video decoder includes a geometry decoder and an attribute decoder. The geometry decoder performs geometry decoding on the geometry bitstream and outputs decoded geometry. The attribute decoder performs attribute decoding on the attribute bitstream based on the decoded geometry, and outputs decoded attributes. The decoded geometry and decoded attributes are used to reconstruct point cloud content (a decoded point cloud).

Figure 11:
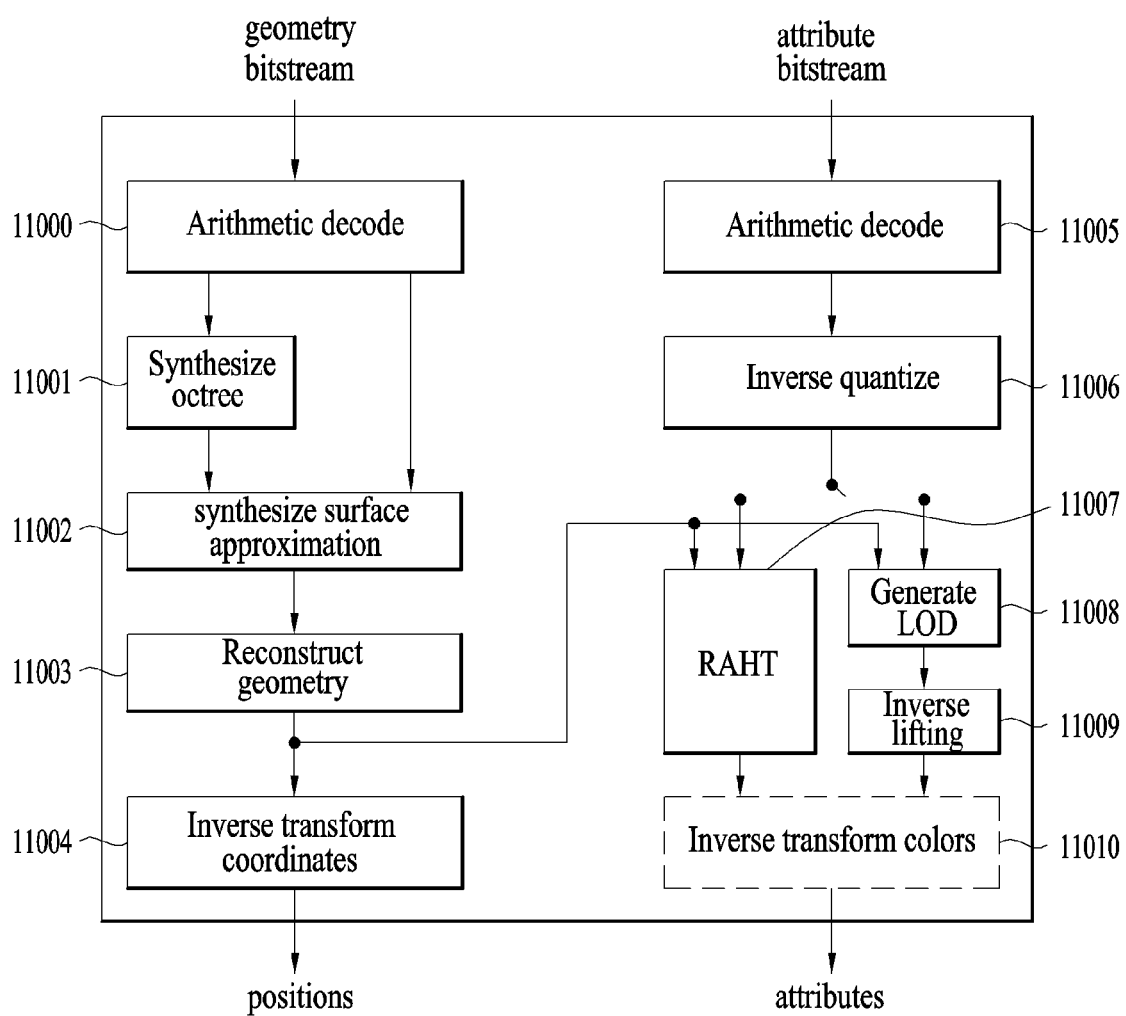
FIG. 11 illustrates an example of a point cloud video decoder according to embodiments.

FIG. 11 illustrates a point cloud video decoder according to embodiments.

The point cloud video decoder illustrated in FIG. 11 is an example of the point cloud video decoder illustrated in FIG. 10, and may perform a decoding operation, which is the reverse of the encoding operation of the point cloud video encoder illustrated in FIGS. 1 to 9.

As described with reference to FIGS. 1 and 10, the point cloud video decoder may perform geometry decoding and attribute decoding. The geometry decoding is performed before the attribute decoding.

The point cloud video decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct decoding and trisoup geometry decoding. The direct decoding and trisoup geometry decoding are selectively applied. The geometry decoding is not limited to the above-described example, and is performed as the reverse of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud video encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud video encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud video encoder.

Although not shown in the figure, the elements of the point cloud video decoder of FIG. 11 may be implemented by hardware including one or more processors or integrated circuits configured to communicate with one or more memories included in the point cloud content providing apparatus, software, firmware, or a combination thereof. The one or more processors may perform at least one or more of the operations and/or functions of the elements of the point cloud video decoder of FIG. 11 described above. Additionally, the one or more processors may operate or execute a set of software programs and/or instructions for performing the operations and/or functions of the elements of the point cloud video decoder of FIG. 11.

Figure 12:
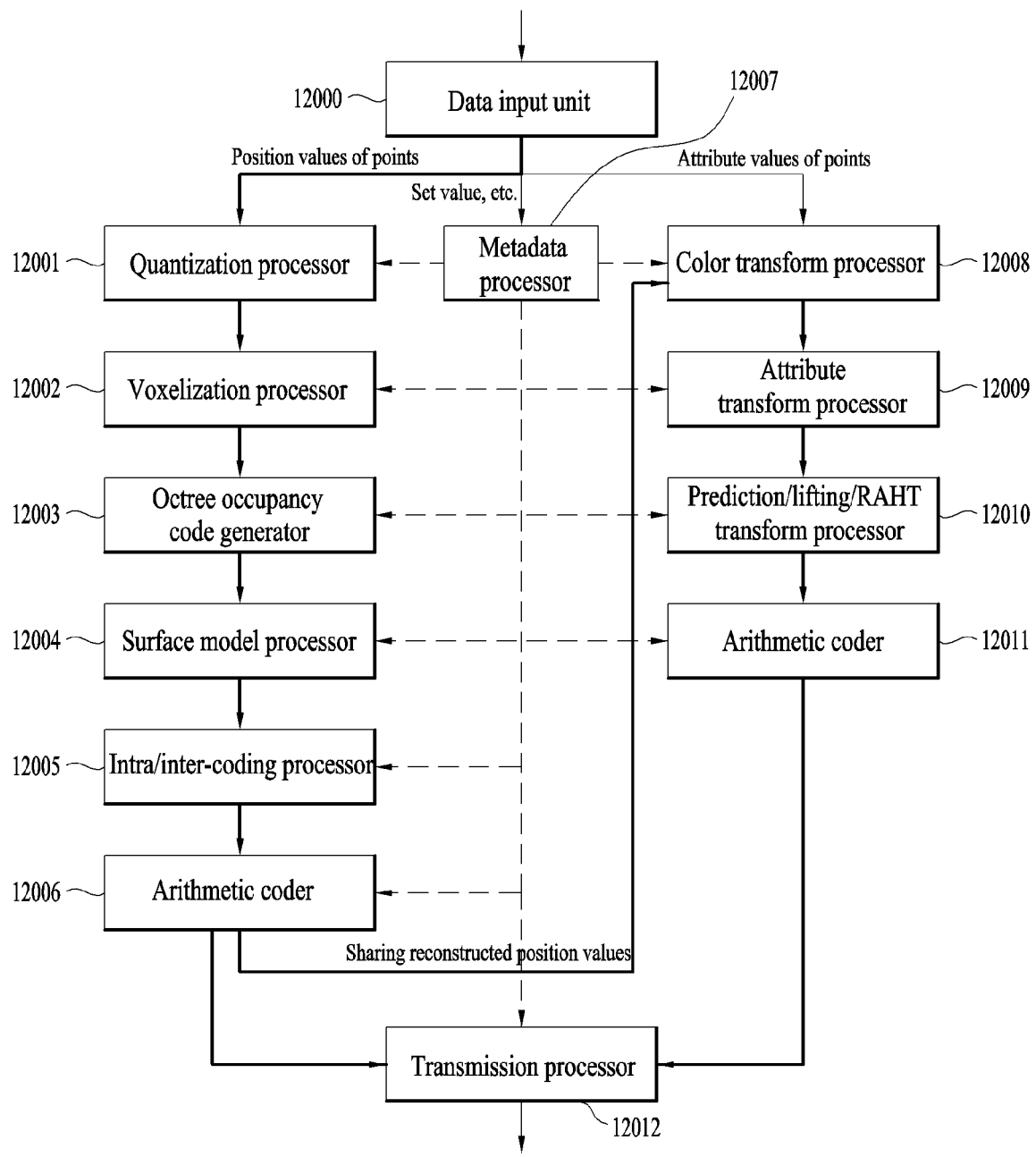
FIG. 12 illustrates a configuration for point cloud video encoding of a transmission device according to embodiments.

FIG. 12 illustrates a transmission device according to embodiments.

The transmission device shown in FIG. 12 is an example of the transmission device 10000 of FIG. 1 (or the point cloud video encoder of FIG. 4). The transmission device illustrated in FIG. 12 may perform one or more of the operations and methods the same as or similar to those of the point cloud video encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquisition unit 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 12002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud video encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same as or similar to the operation and/or method of the point cloud video encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 40012.

The transmission processor 12012 according to the embodiments may transmit each bitstream containing encoded geometry and/or encoded attributes and metadata, or transmit one bitstream configured with the encoded geometry and/or the encoded attributes and the metadata. When the encoded geometry and/or the encoded attributes and the metadata according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS or tile inventory) for signaling of a tile level, and slice data. The slice data may include information about one or more slices. One slice according to embodiments may include one geometry bitstream Geom0$^0$ and one or more attribute bitstreams Attr0$^0$ and Attr1$^0$.

The slice is a series of a syntax element representing in whole or in part of the coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
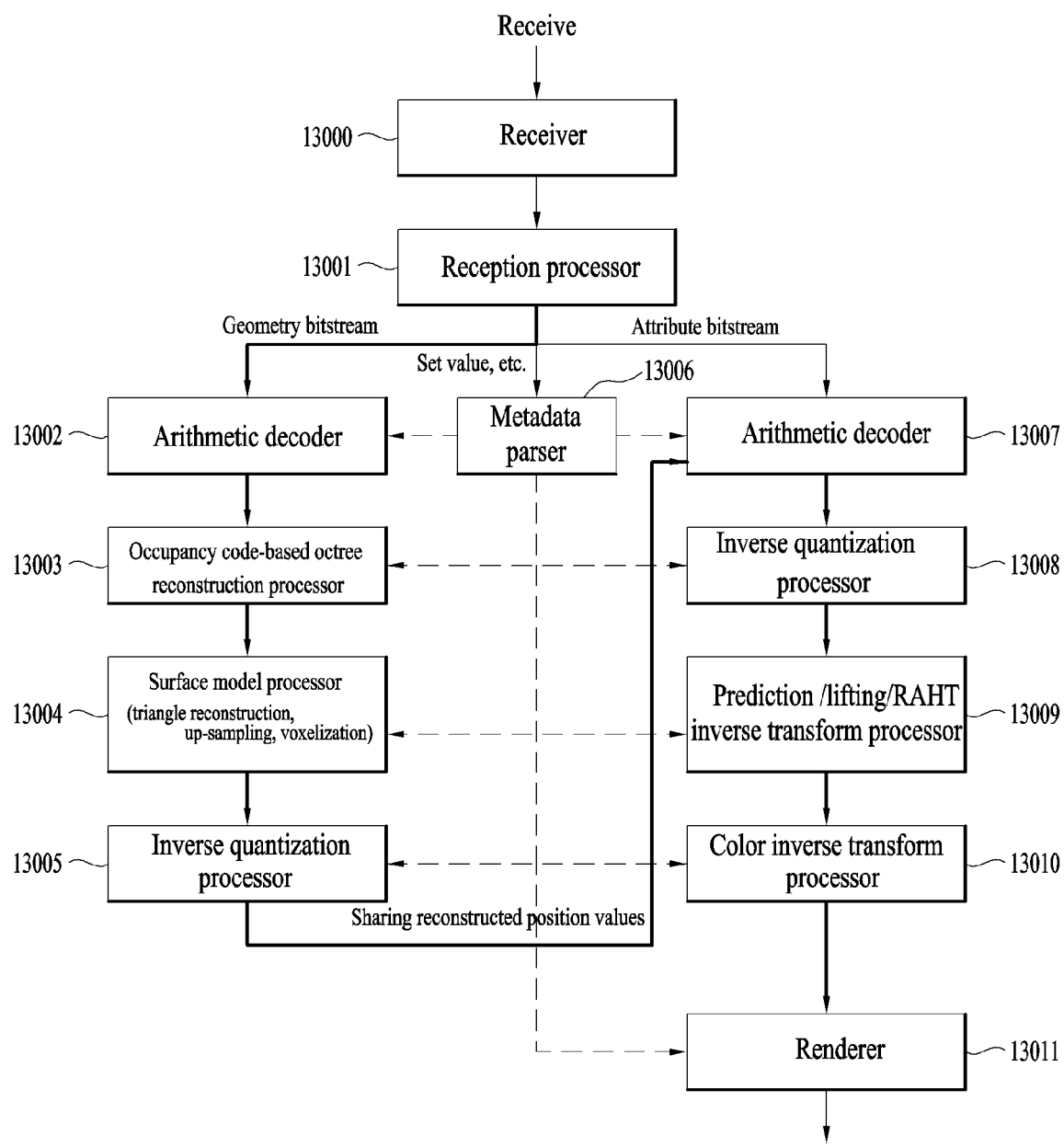
FIG. 13 illustrates a configuration for point cloud video decoding of a reception device according to embodiments.

FIG. 13 illustrates a reception device according to embodiments.

The reception device illustrated in FIG. 13 is an example of the reception device 10004 of FIG. 1 (or the point cloud video decoder of FIGS. 10 and 11). The reception device illustrated in FIG. 13 may perform one or more of the operations and methods the same as or similar to those of the point cloud video decoder described with reference to FIGS. 1 to 11.

The reception device according to the embodiment may include a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform the reverse of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transform processor 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
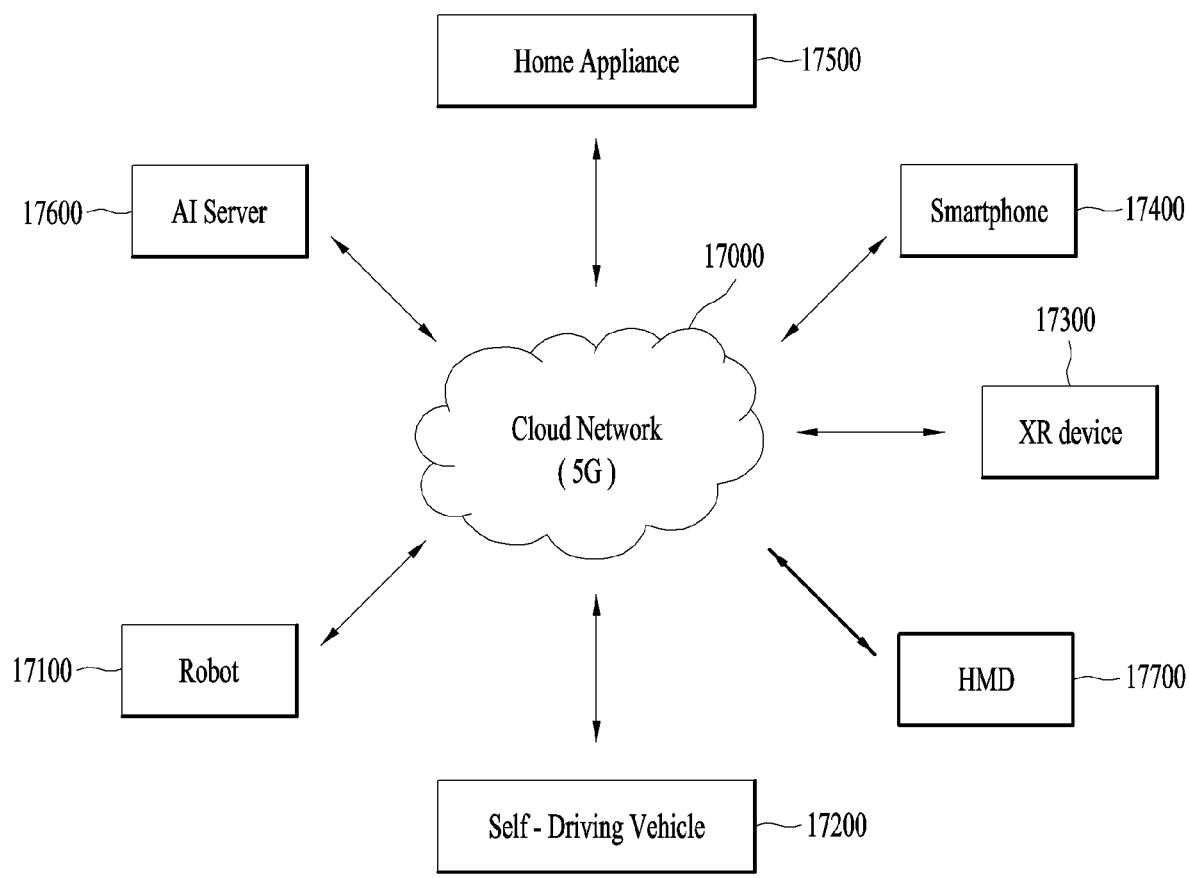
FIG. 14 illustrates an exemplary structure operatively connectable with a method/device for transmitting and receiving point cloud data according to embodiments.

FIG. 14 shows an exemplary structure operatively connectable with a method/device for transmitting and receiving point cloud data according to embodiments.

The structure of FIG. 14 represents a configuration in which at least one of a server 17600, a robot 17100, a self-driving vehicle 17200, an XR device 17300, a smartphone 17400, a home appliance 17500, and/or a head-mount display (HMD) 17700 is connected to a cloud network 17000. The robot 17100, the self-driving vehicle 17200, the XR device 17300, the smartphone 17400, or the home appliance 17500 is referred to as a device. In addition, the XR device 17300 may correspond to a point cloud compression data (PCC) device according to embodiments or may be operatively connected to the PCC device.

The cloud network 17000 may represent a network that constitutes part of the cloud computing infrastructure or is present in the cloud computing infrastructure. Here, the cloud network 17000 may be configured using a 3G network, 4G or Long Term Evolution (LTE) network, or a 5G network.

The server 17600 may be connected to at least one of the robot 17100, the self-driving vehicle 17200, the XR device 17300, the smartphone 17400, the home appliance 17500, and/or the HMD 17700 over the cloud network 17000 and may assist in at least a part of the processing of the connected devices 17100 to 17700.

The HMD 17700 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 17100 to 17500 to which the above-described technology is applied will be described. The devices 17100 to 17500 illustrated in FIG. 14 may be operatively connected/coupled to a point cloud data transmission device and reception according to the above-described embodiments.

<PCC+XR>

The XR/PCC device 17300 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 17300 may analyze 3D point cloud data or image data acquired through various sensors or from an external device and generate position data and attribute data about 3D points. Thereby, the XR/PCC device 17300 may acquire information about the surrounding space or a real object, and render and output an XR object. For example, the XR/PCC device 17300 may match an XR object including auxiliary information about a recognized object with the recognized object and output the matched XR object.

<PCC+Self-Driving+XR>

The self-driving vehicle 17200 may be implemented as a mobile robot, a vehicle, an unmanned aerial vehicle, or the like by applying the PCC technology and the XR technology.

The self-driving vehicle 17200 to which the XR/PCC technology is applied may represent a self-driving vehicle provided with means for providing an XR image, or a self-driving vehicle that is a target of control/interaction in the XR image. In particular, the self-driving vehicle 17200 which is a target of control/interaction in the XR image may be distinguished from the XR device 17300 and may be operatively connected thereto.

The self-driving vehicle 17200 having means for providing an XR/PCC image may acquire sensor information from sensors including a camera, and output the generated XR/PCC image based on the acquired sensor information. For example, the self-driving vehicle 17200 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 17200 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud compression data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

As described with reference to FIGS. 1 to 14, the point cloud data may include a set of points, and each point may have a geometry (referred to also as geometry information) and an attribute (referred to as attribute information). The geometry information represents three-dimensional (3D) position information (xyz) related to each point. That is, the position of each point is represented by parameters in a coordinate system representing a 3D space (e.g., parameters x, y, and z for three axes, X, Y, and Z axes, representing a space). The attribute information represents color (RGB, YUV, etc.), reflectance, normal vectors, transparency, etc. of the point.

According to embodiments, a point cloud data encoding process of the point cloud data transmission method/device includes compressing geometry information based on an octree, a trisoup, or a predictive tree and compressing attribute information based on geometry information reconstructed (or decoded) with position information changed through compression. A point cloud data decoding process of the point cloud data reception method/device includes receiving an encoded geometry bitstream and an encoded attribute bitstream, decoding geometry information based on an octree, a trisoup, or a predictive tree, and decoding attribute information based on geometry information reconstructed through a decoding operation.

The method/device for transmitting and receiving point cloud data according to the embodiments may be simply referred to as a method/device according to the embodiments.

Figure 16:
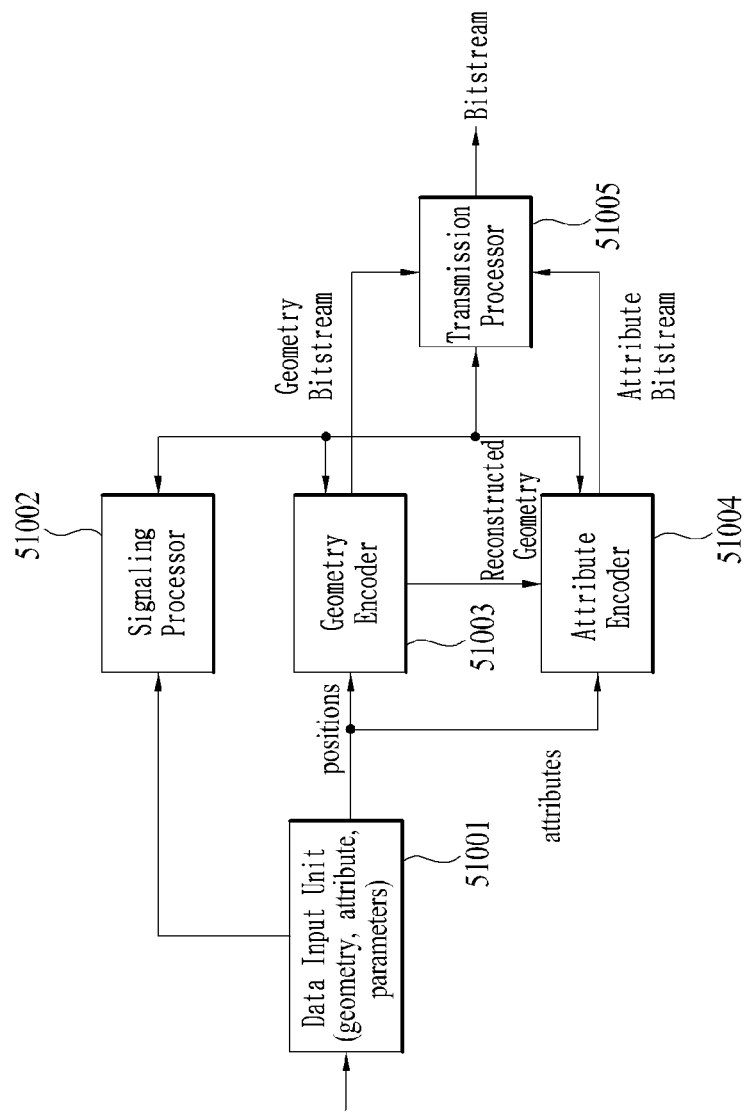
FIG. 16 is a diagram illustrating another example of a point cloud transmission device according to embodiments.

The point cloud data transmission method/device according to the embodiments is construed as a term referring to the transmission device 10000, point cloud video encoder 10002, and transmitter 10003 of FIG. 1, the acquisition 20000-encoding 20001-transmission 20002 of FIG. 2, the point cloud video encoder of FIG. 4, the transmission device of FIG. 12, the device of FIG. 14, the transmission device of FIG. 16, and the like.

Figure 26:
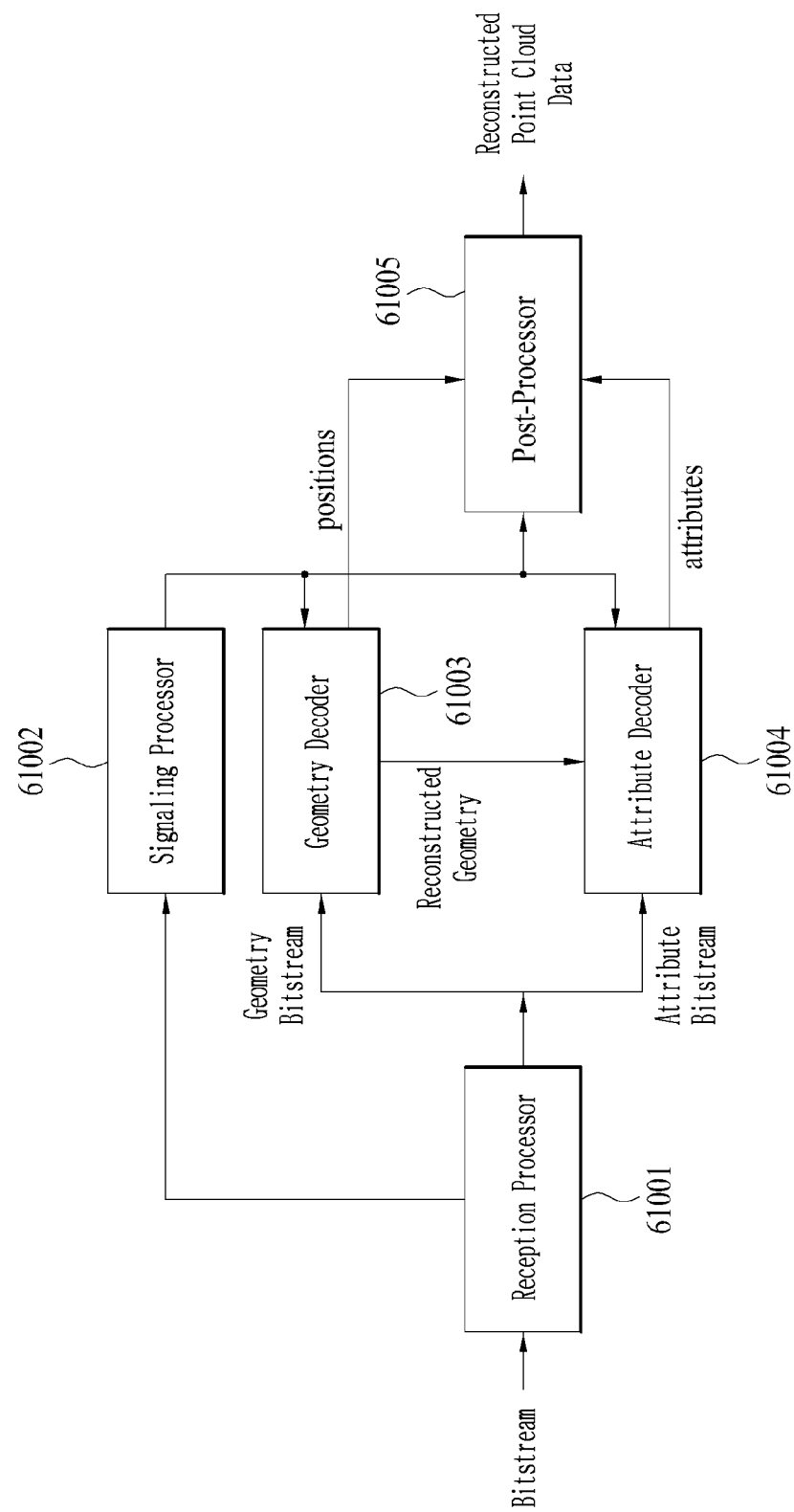
FIG. 26 is a diagram illustrating another example of a point cloud reception device according to embodiments.

The point cloud data reception method/device according to the embodiments is construed as a term referring to the reception device 10004, receiver 10005, and point cloud video decoder 10006 of FIG. 1, the transmission 20002-decoding 20003-rendering 20004 of FIG. 2, the decoder of FIG. 10, the point cloud video decoder of FIG. 11, the reception device of FIG. 13, the device of FIG. 14, the reception device of FIG. 26, and the like.

Figure 17:
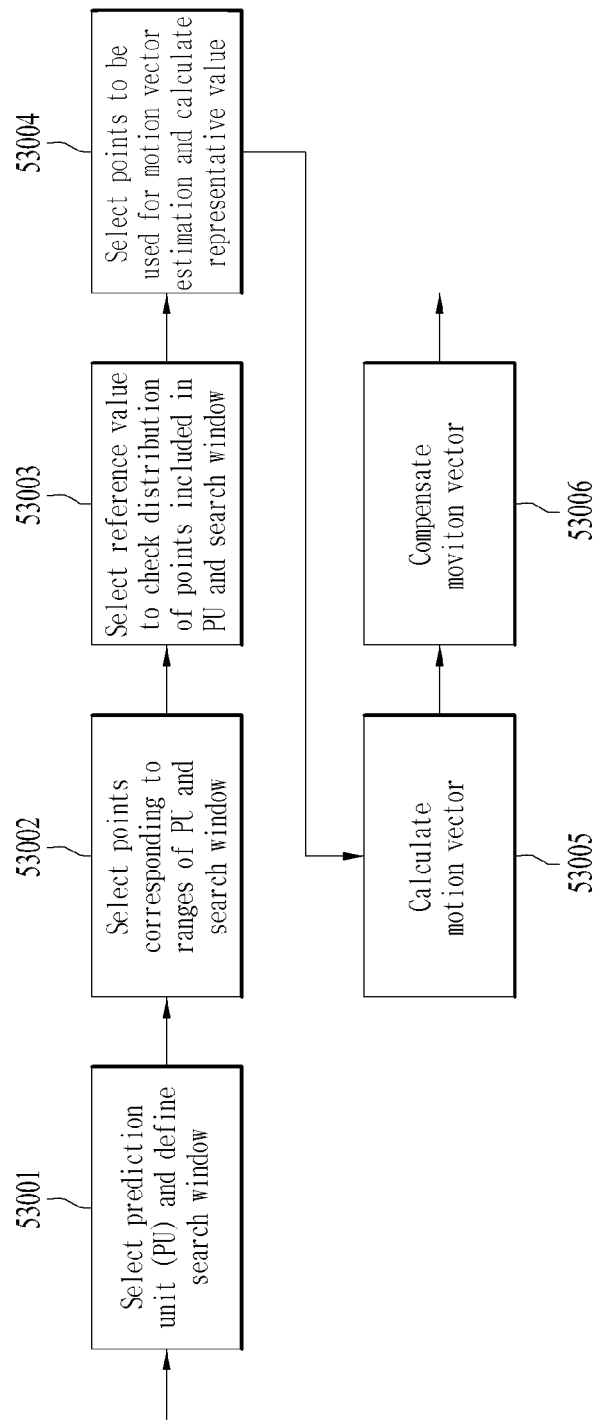
FIG. 17 is an example detailed block diagram of a geometry encoder 51003 according to embodiments.
Figure 19:
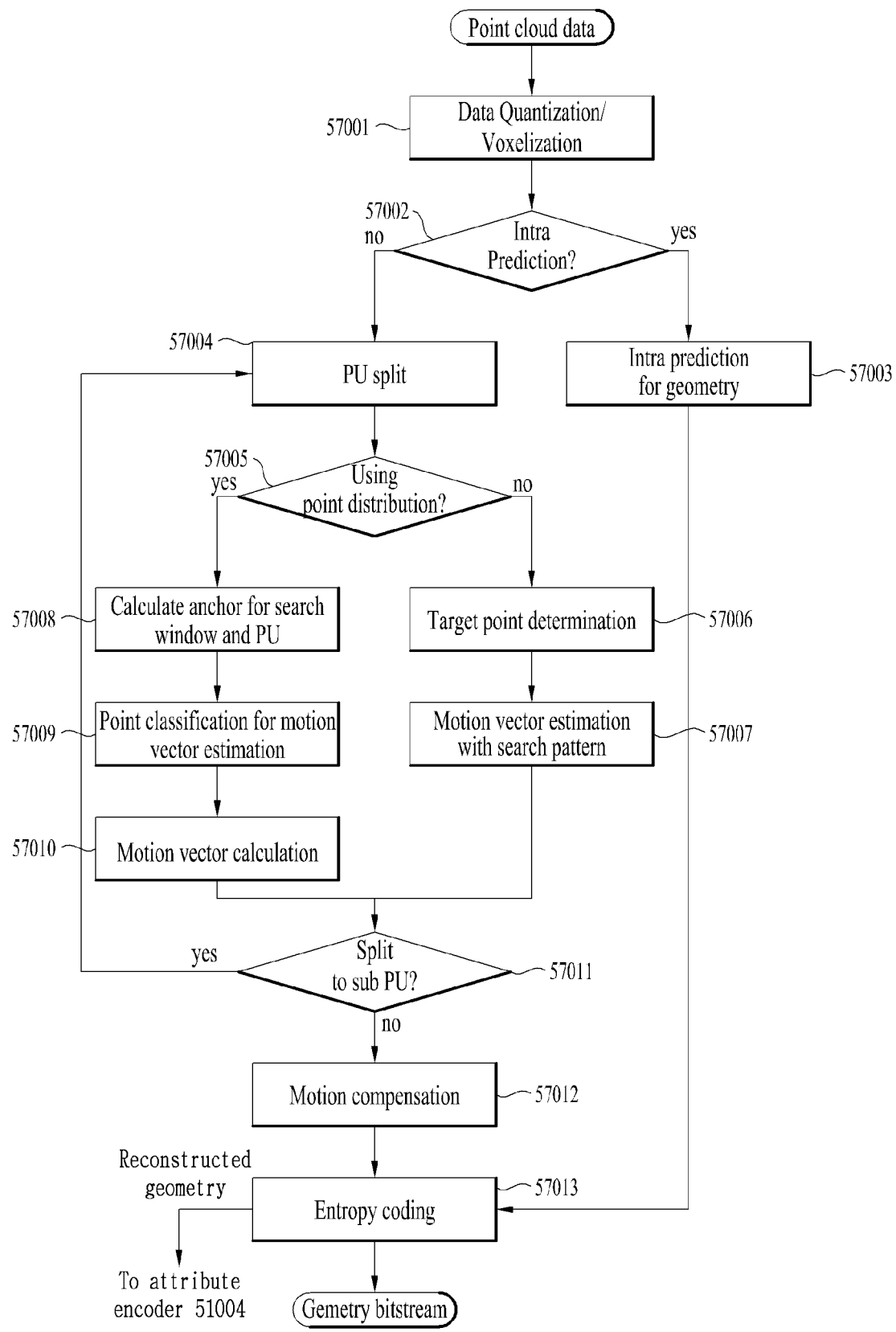
FIG. 19 is a flowchart illustrating an example of encoding of geometry information in consideration of a distribution of points according to embodiments.

According to embodiments, the encoding of the point cloud data may be performed by the point cloud video encoder 10002 of FIG. 1, the encoder 20001 of FIG. 2, the point cloud video encoder of FIG. 4, the point cloud video encoder of FIG. 12, the geometry encoder 51003 of FIG. 16, the geometry encoder of FIG. 17, or the geometry encoding of FIG. 19. The decoding of the point cloud data according to embodiments may be performed by the point cloud video decoder 10006 of FIG. 1, the decoder 20003 of FIG. 2, the point cloud video decoder of FIG. 11, the point cloud video decoder of FIG. 13, the geometry decoder 61003 of FIG. 26, the geometry decoder of FIG. 27, or the geometry decoding of FIG. 28. FIGS. 16, 17, 19, and 26 to 29 will be described in detail later.

The present disclosure is directed to improving compression efficiency by removing redundant information based on correlation between frames in compressing geometry information in point cloud data having multiple frames.

In one embodiment of the present disclosure, compressing geometry information based on an octree is described. The present disclosure is also applicable to other trees other than the octree, such as a predictive tree.

According to an embodiment, the geometry encoder constructs an octree based on the positions of the input points and performs geometry compression based on the octree. The prediction for geometry compression may be performed within a frame, or may be performed between frames. In the present disclosure, the former is referred to as intra-frame prediction and the latter is referred to as inter-frame prediction. That is, geometry coding based on intra-frame prediction is performed based on the similarity between points within the current frame. When point cloud data is composed of consecutive frames, the correlation between neighboring frames is high.

According to embodiments, a prediction unit (PU) and a search window are defined to perform inter-frame geometry compression.

According to embodiments, the search window is defined in the current frame and the predictor is defined in a reference frame (e.g., a previous frame).

In other words, in order to apply an inter-prediction based compression technique using a reference frame to point cloud data having multiple frames, the point cloud data may be split into prediction units (PUs) in an octree structure. In one embodiment, partitioning the point cloud data into PUs and performing motion vector estimation and compensation on a per PU basis may expand the area that can be predicted with local motion vectors, eliminate the need for additional calculations, and reduce the time to encode the point cloud data. For simplicity, the PU may be referred to as a compression unit, a unit, a first unit region, a first region, or the like.

In the present disclosure, points (or nodes) in an octree may be split into a plurality of PUs. In one embodiment, a PU may be defined as a set of neighboring points (or nodes) at a specific depth of the octree in the current frame. In particular, a PU may be defined as a set of points (nodes) that have the same parent. In the present disclosure, a PU may be split into one or more sub-PUs.

According to embodiments, for each PU, motion estimation (ME) may be performed within a search window, which is a range for finding a motion vector (MV) in a reference frame (also referred to as a previous frame).

That is, in the present disclosure, the search window is a range for finding an MV in the reference frame. The search window may be defined as all or part of the reference frame, and may be defined in three-dimensional space. In one embodiment, the size of the search window may be greater than or equal to the size of the PU.

According to embodiments, for inter-frame compression, motion estimation (also referred to as motion vector estimation) is performed in PUs of the current frame within the search window of the reference frame, and motion compensation is performed based on the motion vector (MV) acquired as a result of the motion estimation. In other words, the acquired motion vector is used to estimate information in the current frame based on information in the previous frame. Thereby, prediction points (i.e., points in the reference frame) that are similar to the compression target points (i.e., points in the current frame) may be found in the reference frame based on the similarity between the current frame and neighboring frames.

According to embodiments, a searching pattern (or search pattern) may be used for motion estimation. To this end, a look-up table (LUT) containing at least 6 and up to 26 unit vectors in different directions is provided, and the geometry encoder performs motion compensation with the best motion vector (i.e., the search pattern that minimizes the distance between points) by finding, from the vector difference of the points subject to motion estimation, the best motion vector that must be added to obtain a point in the current frame.

For the information about the unit vectors defined in the LUT, the smallest vector LUT consisting of 6 vectors that may be obtained by rotating each axis by 90° or the largest vector LUT consisting of 26 unit vectors defined by a searching pattern and forming 45° in all directions may be applied. In some embodiments, the LUT is not adaptively applied according to the situation. Rather, the LUT must be manually replaced according to the user's needs. With the motion estimation method using such a search pattern, the motion vector may be found by repeatedly performing the estimation in a predetermined search direction. However, the method requires each target vector (=scale factor× searching pattern) with the smallest difference to be found and iteratively adjusting the scale factor to find the closest motion vector. In other words, all points included in the PU are considered for motion vector estimation without reflecting the distribution of points in performing motion estimation/motion compensation (ME/MC).

In other words, when the difference between the points in the search window and the PU is excessively large, the points are excluded from motion estimation/motion compensation. However, in this case, the all points are compared one by one in terms of distance without considering the distribution of the points in each of the PU and the search window, and the points are excluded when the distance therebetween is greater than a specific distance. As a result, there is a risk of excluding points from the ME/MC targets even though they should be considered as ME/MC targets.

Conversely, there is a risk that a point that should not be subject to ME/MC may be considered as an ME/MC target point and be subject to ME/MC, resulting in a prediction that more motions have occurred than actual motions.

FIGS. 15-(a) and 15-(b) illustrate an example of a distribution of points in a reference frame and a distribution of points in a current frame according to embodiments. More specifically, FIG. 15-(a) shows an example of a distribution of points in a reference frame and FIG. 15-(b) shows an example of a distribution of points in a current frame.

For example, as shown in FIGS. 15-(a) and 15-(b), most of the points are positioned within a dotted circle, but motion estimation using searching points does not take into account such distribution of points. As a result, even the points positioned outside the circle are considered as targets of motion vector estimation. Accordingly, motion estimation by reflecting not only the points inside the circle but also the points outside the circle may lead to a prediction that there have been more motions than the actual ones, which may lower the accuracy of the prediction.

Therefore, the present disclosure is intended to improve compression efficiency by performing motion estimation in consideration of a distribution of points in compressing geometry information based on a motion vector.

According to embodiments, to increase compression efficiency, when compressing geometry information based on motion vectors, motion estimation may be performed in consideration of the distribution of points included in a prediction unit (PU) of the current frame and/or the distribution of points included in a search window of a reference frame.

In one embodiment of the present disclosure, ME may be performed on a PU-by-PU basis. In other words, ME may be performed within a search window of the reference frame (also referred to as the previous frame) for each PU. According to embodiments, the search window may be defined as a whole or part of the reference frame, and may be defined in three-dimensional space.

By performing ME (i.e., motion vector estimation) considering the distribution of points included in the PU of the current frame and/or the distribution of points included in the search window of the reference frame, the compression efficiency of the geometry information may be increased.

In other words, the compression efficiency of the geometry information may be improved by performing motion vector estimation and compensation in consideration of the distribution of points included in the search window of the reference frame and the PU of the current frame in the current octree.

According to embodiments, in order to perform motion vector estimation considering the distribution of points, a reference value (also referred to as reference information) may be calculated. Here, the reference value is used to define the distribution of the points. Then, a specific range from the reference value is set, and at least one point that lies outside the set range is set as an outlier point. Then, the set outlier point is excluded from the motion vector estimation. Accordingly, the geometry encoder may calculate the motion vector based on the position information representing the set of points excluding the outlier point. This may eliminate the need for the geometry encoder to use a search pattern for motion estimation, thereby reducing encoding time and improving accuracy. For example, in FIGS. 15-(*a*) and 15-(*b*), most of the points are positioned inside the dotted circle, and thus ME is performed considering only the points inside the circle.

FIG. 16 is a diagram illustrating another example of a point cloud transmission device according to embodiments. The elements of the point cloud transmission device illustrated in FIG. 16 may be implemented by hardware, software, processors, and/or combinations thereof.

According to embodiments, the point cloud transmission device may include a data input unit 51001, a signaling processor 51002, a geometry encoder 51003, an attribute encoder 51004, and a transmission processor 51005.

The geometry encoder 51003 and the attribute encoder 51004 may perform some or all of the operations described regarding the point cloud video encoder 10002 of FIG. 1, the encoding 20001 of FIG. 2, the point cloud video encoder of FIG. 4, and the point cloud video encoder of FIG. 12.

According to embodiments, the data input unit 51001 receives or acquires point cloud data. The data input unit 51001 may perform some or all of operations of the point cloud video acquisition unit 10001 in FIG. 1 or some or all of the operations of the data input unit 12000 in FIG. 12.

The data input unit 51001 outputs positions of the points of point cloud data to the geometry encoder 51003, and outputs attributes of the points of point cloud data to the attribute encoder 51004. Parameters are output to the signaling processor 51002. In some embodiments, the parameters may be provided to the geometry encoder 51003 and the attribute encoder 51004.

The geometry encoder 51003 constructs an octree using the positions of the input points, splits the octree into PUs, and performs geometry compression on a PU-by-PU basis. In this regard, the prediction for the geometry compression may be performed within a frame, or may be performed between frames. In the present disclosure, the former is referred to as intra-frame prediction and the latter is referred to as inter-frame prediction. The geometry encoder 51003 performs entropy encoding on the geometry information compressed by inter-prediction or intra-prediction and outputs the result to the transmission processor 51005 in the form of a geometry bitstream.

In one embodiment, the present disclosure describes performing geometry compression based on inter-frame prediction. That is, the geometry encoder 51003 performs motion estimation in consideration of the distribution of points included in the PU of the current frame and the distribution of points included in the search window of the reference frame, and compresses the geometry information based on the motion vector acquired through motion estimation.

The geometry encoder 51003 reconfigures the geometry information based on positions changed through compression, and outputs the reconfigured (or decoded) geometry information to the attribute encoder 51004.

The attribute encoder 51004 compresses attribute information based on positions at which geometry encoding is not performed and/or reconfigured geometry information. According to an embodiment, the attribute information may be coded using any one or a combination of one or more of RAHT coding, LOD-based predictive transform coding, and lifting transform coding. The attribute encoder 51004 performs entropy encoding on the compressed attribute information and outputs the information to the transmission processor 51005 in the form of an attribute bitstream.

The signaling processor 51002 may generate and/or process signaling information necessary for encoding/decoding/ rendering of the geometry information and attribute information and provide the generated and/or processed signaling information to the geometry encoder 51003, the attribute encoder 51004, and/or the transmission processor 51005. Alternatively, the signaling processor 51002 may be provided with the signaling information generated by the geometry encoder 51003, the attribute encoder 51004, and/or the transmission processor 51005. The signaling processor 51002 may provide information fed back from the reception device (e.g., head orientation information and/or viewport information) to the geometry encoder 51003, the attribute encoder 51004, and/or the transmission processor 51005.

In the present disclosure, the signaling information may be signaled and transmitted in units of a parameter set (an SPS, a GPS, an APS, and a TPS (also referred to as a tile inventory)). In addition, the signaling information may be signaled and transmitted in units of a coding unit (or a compression unit or a prediction unit) of each image, such as a slice or a tile. According to embodiments, partitioning of the point cloud data (into, for example, slices, tiles, or PUs) may be performed by the data input unit 51001 or by the geometry encoder 51003.

The transmission processor 51005 may perform the same or similar operation and/or transmission method as or to the operation and/or transmission method of the transmission processor 12012 of FIG. 12 and perform the same or similar operation and/or transmission method as or to the transmitter 1003 of FIG. 1. For details, refer to the description of FIG. 1 or FIG. 12. The description of the details will be omitted below.

The transmission processor 51005 may multiplex the geometry bitstream output from the geometry encoder 51003, the attribute bitstream output from the attribute encoder 51004, and the signaling bitstream output from the signaling processor 51002 into one bitstream. The multiplexed bitstream may be transmitted as it is or may be encapsulated in a file or a segment and transmitted. In one embodiment of the present disclosure, the file may be in an ISOBMFF file format.

According to embodiments, the file or the segment may be transmitted to the reception device or stored in a digital storage medium (e.g., a USB drive, SD, CD, DVD, Blu-ray disc, HDD, SSD, etc.). The transmission processor 51005 according to the embodiments may communicate with the reception device through wired/wireless communication over a network such as a 4G, 5G, or 6G network. In addition, the transmission processor 51005 may perform necessary data processing depending on a network system (e.g., a 4G, 5G, or 6G communication network system). The transmission processor 51005 may transmit encapsulated data according to an on-demand scheme.

According to embodiments, compression-related information is included in the SPS, GPS and/or TPS and/or geometry data unit (also referred to as a geometry slice bitstream) and transmitted by at least one of the signaling processor 51002, the geometry encoder 51003, or the transmission processor 51005.

FIG. 17 is an example detailed block diagram of a geometry encoder 51003 according to embodiments. More specifically, FIG. 17 is a detailed block diagram of the geometry encoder 51003 configured to perform geometry compression based on inter-frame correlation according to embodiments. In other words, FIG. 17 illustrates a process for identifying the distribution of points included in the PU of the current frame and the search window of the reference frame within the two regions (i.e., the PU and the search window) and finding a motion vector based on the distribution of points. The elements of the geometry encoder illustrated in FIG. 17 may be implemented by hardware, software, processors, and/or combinations thereof.

According to embodiments, the geometry encoder 51003 includes a first selector 53001 configured to select a PU region and a search window region, a second selector 53002 configured to select points corresponding to the respective ranges of the PU and the search window, a third selector 53003 configured to select a reference value for the points, a fourth selector 53004 configured to select points for motion estimation based on the reference values, a motion vector calculator 53005 configured to estimate a motion vector based on the selected points, and a motion vector compensator 53006 configured to perform motion compensation based on the motion vector. In FIG. 17, the first selector 53001 may be referred to as a region selector and the second selector 53002 may be referred to as a candidate point selector. Also, the third selector 53003 may be referred to as a reference value selector and the fourth selector 53004 may be referred to as a representative value selector. In FIG. 17, the order of execution of the respective blocks may be changed, some blocks may be omitted, and some new blocks may be added.

According to embodiments, the first selector 53001 selects a PU to be currently encoded from among the PUs in the current frame and defines (or selects) a search window, which is a range for finding a motion vector in the reference frame for the selected PU. In one embodiment, the size of the search window is greater than or equal to the size of the PU. In the present disclosure, the motion estimation for the selected PU is performed within the search window. In the present disclosure, it is assumed that the points of the point cloud data have already been split into PUs by the data input unit 51001 or the geometry encoder 51003.

Once the PU and the search window are determined by the first selector 53001, the second selector 53002 finds the points included in the PU and the points included in the search window and selects the points as candidate groups for finding the motion vector, respectively. For simplicity, the points included in the PU may be referred to as PU candidate points (or a PU candidate group), and the points included in the search window may be referred to as search window candidate points (or a search window candidate group).

Once the candidate points are selected by the second selector 53002, the third selector 53003 selects a reference value based on the candidate points in each region (i.e., each of the PU and the search window) in order to identify data distribution characteristics that the candidate points selected by the second selector 53002 have in each region.

According to embodiments, the reference value may be a mean, a median, or the like. In the present disclosure, the reference value can be replaced by any value that may represent an attribute of a dataset. In the present disclosure, the reference value may be referred to as representative position information for indicating a distribution of points.

For example, the mean of the PU candidate points and the mean of the search window candidate points may be obtained and set as the reference values for the PU and the search window, respectively. As another example, the median of the PU candidate points and the median of the search window candidate points may be set as the reference values for the PU and the search window, respectively. In one embodiment, the definition of median is a value corresponding to 50% of the dataset (e.g., candidate points), i.e., the value that is literally in the center.

Once the reference values for the PU and the search window are selected by the third selector 53003, the fourth selector 53004 selects points to be subject to motion estimation from among the PU candidate points based on the reference value for the PU, selects points to be subject to motion estimation from among the search window candidate points based on the reference value for the search window, and obtains the mean coordinates of the selected points. That is, the fourth selector 53004 excludes from the PU candidate points the point(s) that are outside a specific range from the reference value for the PU, and excludes from the search window candidate points the point(s) that are outside a specific range from the reference value for the search window. In other words, the PU candidate point(s) that are outside a specific range from the reference value for the PU and the search window candidate point(s) that are outside a specific range from the reference value for the search window are not subject to motion estimation. That is, they are excluded from the motion estimation targets.

In one embodiment, the exclusion of point(s) that are outside a specific range from the reference value from the selected candidates is performed based on the standard deviation when the reference value is the mean, or based on the interquartile range (IQR) when the reference value is the median. Here, the IQR is a value for measuring the degree of variation in the data and calculating a range from the median. In other words, the IQR represents the degree to which 50% of the data is scattered in the middle. Thus, the IQR may be derived as Q3-Q1, where Q1 is the median in a range below the median of the data and Q3 is the median in a range above the median of the data. For example, if the median is the value when the data is halved, the IQR represents the two quarters in the middle when the data is split into quarters.

Figure 18:
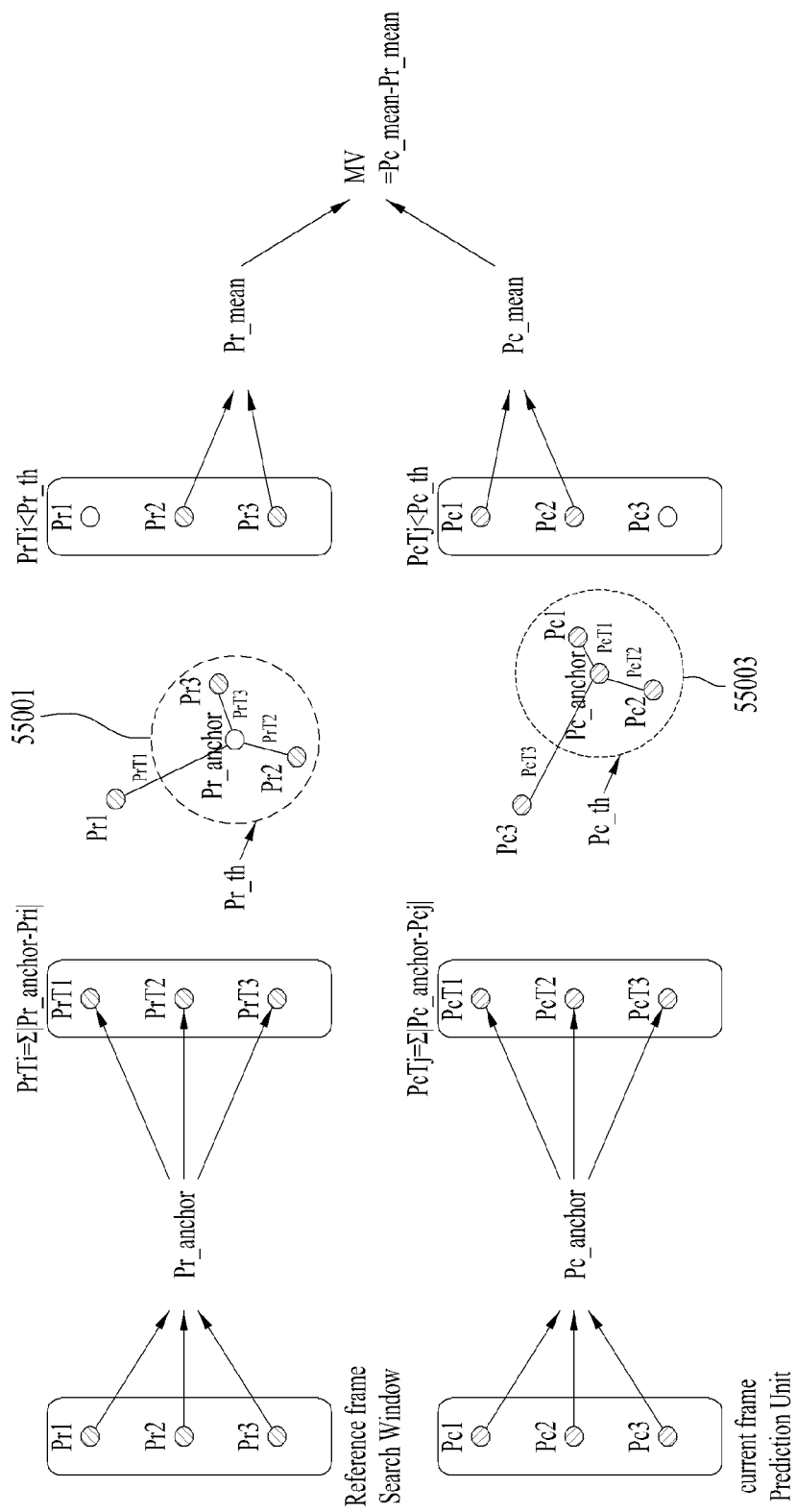
FIG. 18 illustrates an example of setting the mean as a reference value and performing motion vector estimation according to embodiments.

FIG. 18 illustrates an example of setting the mean as a reference value and performing motion vector estimation according to embodiments.

For example, when the points (i.e., candidate points) in the search window are assumed to be Pr1, Pr2, and Pr3, the mean coordinates (Pr_anchor_x, Pr_anchor_y, and Pr_anchor_z) of the points Pr1, Pr2, and Pr3 in the search window are calculated. In other words, the mean coordinates (Pr_anchor_x, Pr_anchor_y, Pr_anchor_z) are the reference values of the points (i.e., candidate points) included in the search window: Then, PrT1, PrT2, and PrT3, which are the distances between the mean coordinates (Pr_anchor) and each of the candidate points Pr1, Pr2, and Pr3, are calculated (PrT1=Pr_anchor-Pr1, PrT2=Pr_anchor-Pr2, PrT3=Pr_anchor-Pr3). For example, as a distance calculation method, Euclidean distance calculation or Manhattan distance calculation may be used.

Equation 5 below shows an example of calculating the distance PrT1 between the coordinates of a first point among the candidate points in the search window; Pr1 (Pr1_x, Pr1_y, Pr1_z), and the reference value for the search window, Pr_anchor ((Pr_anchor_x, Pr_anchor_y, Pr_anchor_z), which is the mean coordinates, as a Manhattan distance.

$$PrT1=|Pr\_anchor\_x-Pr1\_x|+|Pr\_anchor\_y-Pr1\_y|+|Pr\_anchor\_z-Pr1\_z| \quad \text{[Equation 5]}$$

When the distance PrT1 calculated in Equation 5 is within the range of the threshold Pr_th (55001), the first point may be selected as a target point for motion vector estimation. When it is outside the range, the point may be excluded from the targets of motion vector estimation. In other words, if the first point is positioned within a region centered at the mean coordinate Pr_anchor with a radius of the threshold Pr_th (55001), the first point is selected as a target point for motion vector estimation. Otherwise, the first point is excluded from the target points for motion vector estimation. Here, the threshold Pr_th (55001) may be defined to be within a specific range from the standard deviation of the distances between the points included in the search window of the reference frame and Pr_anchor or the mean of the distances. FIG. 18 shows an example where the first point Pr1 is excluded from the target points for motion vector estimation. The same process is applied to the second point Pr2 and third point Pr3, which are not described above, to select them as target points for motion vector estimation or exclude them from the target points. FIG. 18 shows an example of selecting two points Pr1 and Pr2 from among the three points Pr1, Pr2, and Pr3 in the search window as target points for motion vector estimation. According to embodiments, Pr_mean (Pr_mean_x, Pr_mean_y, Pr_mean_z), which is the mean coordinates of the target points Pr2 and Pr3 for motion vector estimation, may be set to a position or position information representing the search window in the reference frame. In other words, Pr_mean may be referred to as position information representing the set of points in the search window excluding the outlier point(s). In another embodiment, the position information representing the set of points excluding the outlier point(s) in the search window may be the median of the points Pr2 and Pr3 selected as targets of motion vector estimation.

The same or similar method as the search window may be applied to the PU of the current frame to select target points for motion vector estimation from among the PU candidate points.

For example, assuming that the points (i.e., candidate points) included in the PU are Pc1, Pc2, and Pc3, the mean coordinates (Pc_anchor_x, Pc_anchor_y, Pc_anchor_z) of the points Pc1, Pc2, and Pc3 included in the PU are calculated. In other words, the average coordinates (Pc_anchor_x, Pc_anchor_y, Pc_anchor_z) are the reference values for the points (i.e., the candidate points) included in the PU. Then, PcT1, PcT2, and PcT3, which are the distances between the mean coordinates Pc_anchor and the respective candidate points Pc1, Pc2, and Pc3, are calculated (PcT1=Pc_anchor-Pc1, PcT2=Pc_anchor-Pc2, PcT3=Pc_anchor-Pc3). Similar to the search window, the distance calculation method used may be Euclidean distance calculation or Manhattan distance calculation.

Equation 6 below shows an example of calculating the distance PcT1 between Pc1 (Pc1_x, Pc1_y, Pc1_z), the coordinates of a first point among the PU candidate points, and Pc_anchor ((Pc_anchor_x, Pc_anchor_y, Pc_anchor_z), the reference values for the PU, as a Manhattan distance.

$$PcT1 = |Pc\_anchor\_x - Pc1\_x| + |Pc\_anchor\_y - Pc1\_y| + |Pc\_anchor\_z - Pc1\_z| \quad \text{[Equation 6]}$$

When the distance PcT1 calculated in Equation 6 is within the range of the threshold Pc_th (55003), the first point may be selected as a target point for motion vector estimation. When it is outside the range, the point may be excluded from the targets of motion vector estimation. In other words, if the first point is positioned within a region centered at the mean coordinate Pc_anchor with a radius of the threshold Pc_th (55003), the first point is selected as a target point for motion vector estimation. Otherwise, the first point is excluded from the target points for motion vector estimation. Here, the threshold Pc_th (55003) may be defined to be within a specific range from the standard deviation of the distances between the points included in the PU of the current frame and Pc_anchor or the mean of the distances. The same process is applied to the second point Pc2 and third point Pc3, which are not described above, to select them as target points for motion vector estimation or exclude them from the target points. FIG. 18 shows an example of selecting two points Pc1 and Pc2 from among the three points Pc1, Pc2, and Pc3 as target points for motion vector estimation. According to embodiments, Pc_mean (Pc_mean_x, Pc_mean_y, Pc_mean_z), which is the mean coordinates of the target points Pc1 and Pc2 for motion vector estimation, may be set to a position or position information representing the PU in the current frame. In other words, Pc_mean may be referred to as position information representing the set of points in the PU excluding the outlier point(s). In another embodiment, the position information representing the set of points excluding the outlier point(s) in the PU may be the median of the points Pc1 and Pc2 selected as targets of motion vector estimation.

In other words, even for the PU in the current frame, the distances PcT1, PcT2, and PcT3 to the points Pc1, Pc2, and Pc3 included in the PU are based on the Pc_anchor, which is the mean coordinates of the points. Then, when the calculated distance is within the range of a threshold Pc_th (55003), the point is selected as a target point for motion vector estimation. When the calculated distance is outside the range of the threshold Pc_th (55003), the point is excluded from the target points for motion vector estimation. Then, Pc_mean (Pc_mean_x, Pc_mean_y, Pc_mean_z), which is the mean coordinates of the points selected as the target point(s), is calculated. The thresholds Pr_th and Pc_th may be included in the geometry compression related information and transmitted to the reception side.

As described above, once the mean coordinates Pc_mean of the target points for motion vector estimation in the PU and the mean coordinates Pr_mean of the target points for motion vector estimation in the search window are calculated by the fourth selector 53004, the motion vector calculator 53005 may derive a motion vector (MV) as the difference (Pc_mean−Pr_mean) between the mean coordinates Pc_mean of the target points for motion vector estimation in the PU and the mean coordinates Pr_mean of the target points for motion vector estimation in the search window (MV=Pc_mean−Pr_mean). In other words, the motion vector may be acquired by subtracting the position information representing the search window from the position information representing the PU.

Once the motion vector is calculated by the motion vector calculator 53005, the motion compensator 53006 performs motion compensation based on the calculated MV.

According to embodiments, the motion compensator 53006 may estimate a predictor of the PU to be coded in a reference frame based on the MV acquired through motion estimation. Furthermore, once the motion-applied predictor is generated, the motion compensator 53006 may perform inter-frame prediction using the predictor to select inter-prediction mode information. In other words, the motion compensator 53006 may find a point in the predictor that is similar to the compression target point of the current PU and perform inter-frame prediction based thereon. In other words, a prediction point (or node) similar to the compression target point (or node) of the PU in the current frame may be generated (or selected) within the search window of the reference frame. Further, the residual information generated based on the selected inter-prediction mode information is entropy coded. The selection of the inter-prediction mode and generation of the residual information described above may be performed by the motion compensator 53006, or may be performed in a separate block.

According to embodiments, the MV information for identifying the MV calculated by the motion vector calculator

53005 may be entropy coded and then transmitted in signaling information. For example, the signaling information may include geometry compression related information, wherein the geometry compression related information may include MV information. According to embodiments, the geometry compression-related information may be transmitted in the SPS, GPS, and/or TPS and/or geometry data unit (also referred to as geometry slice bitstreams).

FIG. 19 is a flowchart illustrating an example of encoding of geometry information in consideration of a distribution of points according to embodiments. The operations shown in FIG. 19 may be performed by point cloud data transmission devices according to embodiments (e.g., the transmission device of FIG. 1, the encoding of FIG. 2, the point cloud video encoder of FIG. 4, the transmission device of FIG. 12, the geometry encoder of FIG. 16, or the geometry encoder of FIG. 17), or a combination thereof. The elements of the point cloud data transmission device according to the embodiments may be configured by hardware, software, processors, and/or combinations thereof.

In FIG. 19, once point cloud data is input, data quantization and voxelization are performed to facilitate compression processing, and an octree is generated based thereon (operation 57001).

In the process of quantization, voxelization, and octree generation according to the embodiments, the same or similar operations to the quantization, and/or voxelization, and/or octree generation described with reference to FIG. 4 may be performed. Details are the same as those described with reference to FIGS. 1 to 9.

It is determined whether the prediction mode for geometry compression based on the octree is intra prediction or inter prediction (operation 57002). This may be determined using flag information. The flag information may be included in the geometry compression related information and transmitted to the reception side.

When it is determined in operation 57002 that the prediction mode is intra prediction, the process proceeds to operation 57003 to perform intra-frame prediction for the geometry.

When it is determined in operation 57002 that the prediction mode is inter prediction, the process proceeds to operation 57004 for inter prediction to split the points (or nodes) in the octree structure of the current frame into PUs. In the present disclosure, a PU is defined as a subset belonging to the octree. After the PU splitting in operation 57004, points included in each of the PUs are searched for, and a search window is defined (or selected) in a reference frame. In one embodiment, the search window is defined (or selected) in the reference frame as a window region that includes the PU region and is larger than the PU. Then, the points included within the search window are searched for.

In operation 57004, once the points included in each region (PU and search window) are determined, motion estimation is performed on a PU-by-PU basis. In this case, the motion estimation may be performed using a search pattern, or may be performed using the distribution of the points.

To this end, in operation 57005, it is determined whether a distribution of points is to be used. This operation may be determined using flag information (e.g., at least one of distribute_MEMC_enable, gps_Distribute_MEMC_enable, or gbh_Distribute_MEMC_enable), which may be included in the geometry compression related information and transmitted to the reception side.

Once it is determined in operation 57005 that the point distribution is not to be used, the process proceeds to operation 57006 to determine a target point, and proceeds to operation 57007 to perform motion vector estimation based on the search pattern. For example, when it is determined that the point distribution is not to be used, the distance between the PU and the points belonging to the search window is compared with a predetermined distance. Then, the points whose distance is greater than the predetermined distance are excluded from the target points for motion compensation, and a distance of the remaining points is selected as a target value for motion estimation and stored in a buffer. Then, after applying a scale value to the search pattern, the motion vector estimation is performed to designate the search pattern x scale value with the smallest difference as a motion vector after comparing the pattern with the target value stored in the buffer.

When it is determined in operation 57005 that the point distribution is to be used, the process proceeds to operation 57008. In operation 57008, the points in the PU found in operation 57004 are selected as PU candidate points for finding the motion vector, and the points included in the search window are selected as search window candidate points for finding the motion vector.

Then, a reference value is selected (or calculated) based on the candidate points in each region (i.e., each of the PU and the search window) in order to identify data distribution characteristics that the candidate points selected by the second selector 53002 have in each region. According to embodiments, the reference value may be a mean, a median, or the like. In the present disclosure, the reference value may be referred to as anchor position information or reference position information to represent a distribution of points.

Once the reference values (or anchor position information or reference position information) of the points included in the PU and the search window are calculated in operation 57008, respectively, the points subject to motion estimation are selected from among the PU candidate points and the search window candidate points based on a threshold (e.g., Pc_th, Pr_th) included in the geometry compression related information in the signaling information in operation 57009. In other words, the points to which motion vector estimation is to be applied are classified from among the PU candidate points and the search window candidate points, respectively. In other words, the point(s) that are outside a specific range from the reference value for the PU are excluded from the PU candidate points, and the point(s) that are outside a specific range from the reference value for the search window are excluded from the search window candidate points. In one embodiment, the exclusion of point(s) that are outside a specific range from the reference value from the selected candidates is performed based on the standard deviation when the reference value is the mean, or based on the interquartile range (IQR) when the reference value is the median. See Equations 5 and 6 above for more details.

In operation 57009, when the points to be subjected to motion vector estimation are selected from among the PU candidate points and the search window candidate points, that is, the points to be subjected to motion vector estimation are classified, the motion vector is calculated based on the classified points in operation 57010.

In other words, once the points to be subjected to motion estimation are selected in the PU and the search window, respectively, considering the distribution of the points, the representative position information for the PU is obtained based on the selected points to be subjected to motion estimation in the PU, and the representative position information for the search window is obtained based on the selected points to be subjected to motion estimation in the search window. The representative position information may be the mean (i.e., the mean coordinates) or the median of the points selected as targets of the motion vector estimation. For example, once the mean coordinates (i.e., representative position information) of the points that are the targets of the motion vector estimation in the PU and the mean coordinates (i.e., representative position information) of the points that are the targets of the motion vector estimation in the search window are calculated, the motion vector may be acquired by subtracting the mean coordinates of the points that are the targets of the motion vector estimation in the search window from the mean coordinates of the points that are the targets of the motion vector estimation in the PU.

After operation 57007 or operation 57010 is performed, it is checked whether the PU is further split into sub-PUs (operation 57011).

If it is determined in operation 57011 that the PU is split into sub-PUs, the process goes back to operation 57004 and repeats the operations described above. In other words, after the motion vector estimation is completed in operation 57007 or 57010, the cost for splitting into sub-PUs is calculated. Then, if the PU is split into sub-PUs, the process repeats from operation 57004.

If it is determined in operation 57011 that there is no splitting into sub-PUS, motion compensation is performed based on the motion vector calculated in operation 57007 or the motion vector calculated in operation 57010 (operation 57012).

That is, in operation 57012, a predictor of the PU to be coded may be estimated in the reference frame based on the MV. In one example, when the MV is provided in operation 57007, intra-frame prediction is performed based on the predictor to select intra-prediction mode information, and residual information is generated based thereon in operation 57012. In another example, when the MV is provided in operation 57010, inter-frame prediction is performed based on the predictor to select inter-prediction mode information, and residual information is generated based thereon in operation 57012. In other words, a prediction point (or node) similar to the compression target point (or node) of the PU in the current frame may be generated (or selected) within the search window of the reference frame. According to embodiments, motion compensation may be performed prior to encoding. Alternatively, the MV may be delivered to the decoder of the reception device and motion compensation may be performed in decoding.

In operation 57013, entropy coding is performed on the inter-prediction mode information and residual information, or on the intra-prediction mode information and residual information, and outputs the coded information to the transmission processor 51005 in the form of a geometry bitstream.

Further, in operation 57012 or operation 57013, the geometry information is reconstructed based on the positions changed through compression, and the reconstructed (or decoded) geometry information is output to the attribute encoder 51004 for attribute compression.

In the structure shown in FIG. 19, the geometry and attribute coding are separated to define the transmission device, but the geometry information and the attribute information belonging to the corresponding geometry may be used together in splitting the PU.

For any portion of FIG. 19 that is not described or omitted, refer to the description of FIGS. 15 to 18.

Figure 20:
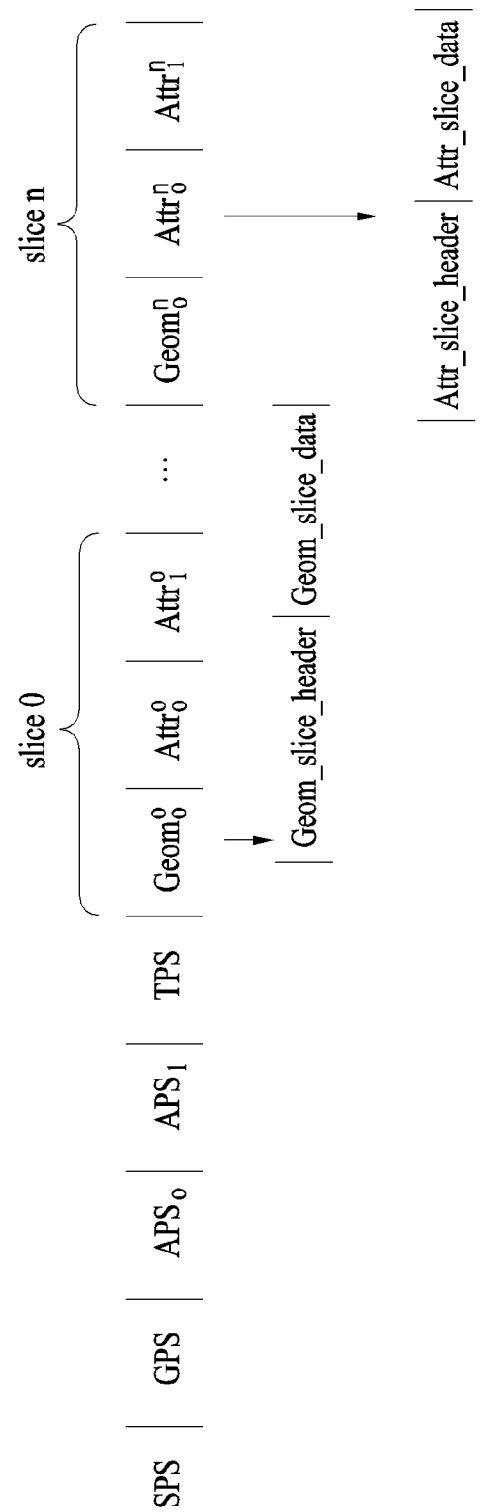
FIG. 20 shows an example bitstream structure of point cloud data for transmission/reception according to embodiments.

FIG. 20 shows an example bitstream structure of point cloud data for transmission/reception according to embodiments. According to embodiments, a bitstream output from the point cloud video encoder of one of FIGS. 1, 2, 4, 12, and 16 may be in the form of FIG. 20.

According to embodiments, the bitstream of point cloud data provides tiles or slices to allow point cloud data to be divided into regions to be processed. Each region of the bitstream according to embodiments may have different importance. Therefore, when point cloud data is divided into tiles, different filters (encoding methods) and different filter units may be applied to the tiles, respectively. When point cloud data is divided into slices, different filters and different filter units may be applied to the slices, respectively.

The transmission device according to the embodiments may transmit point cloud data according to the bitstream structure as shown in FIG. 20, and thus may provide a method of applying different encoding operations according to importance and using an encoding method with good quality in an important region. In addition, efficient encoding and transmission according to the characteristics of point cloud data may be supported and attribute values according to user requirements may be provided.

The receiving device according to embodiments receives point cloud data according to the bitstream structure as shown in FIG. 20, and thus a different filtering method (decoding method) may be applied for each region (region divided into tiles or slices) instead of using a complicated decoding (filtering) method for the entire point cloud data according to the processing capacity of the reception device. Accordingly, a better image quality in a region important to a user and appropriate latency on a system may be ensured.

When a geometry bitstream, an attribute bitstream, and/or a signaling bitstream (or signaling information) according to embodiments constitute one bitstream (or G-PCC bitstream) as shown in FIG. 20, the bitstream may include one or more sub-bitstreams. According to embodiments, a bitstream may include a sequence parameter set (SPS) for signaling of a sequence level, a geometry parameter set (GPS) for signaling of geometry information coding, one or more attribute parameter sets (APS0 and APS1) for signaling of attribute information coding, a tile inventory (also referred to as a TPS) for signaling at a tile level, and one or more slices (slice 0 to slice n). That is, a bitstream of point cloud data according to embodiments may include one or more tiles, wherein each tile may be a slice group including one or more slices (slice 0 to slice n). The tile inventory (i.e., TPS) may include information about each of the one or more tiles (e.g., coordinate value information and height/size information related to a tile bounding box). Each slice may include one geometry bitstream (Geom0 and/or one or more attribute bitstreams (Attr0 and Attr1). For example, slice 0 may include one geometry bitstream (Geom0$^0$) and one or more attribute bitstreams (Attr0$^0$ and Attr1$^0$).

The geometry bitstream in each slice may include a geometry slice header (geom_slice_header) and geometry slice data (geom_slice_data). According to embodiments, the geometry bitstream in each slice may be referred to as a geometry data unit, and the geometry slice header may be referred to as a geometry data unit header. Also, the geometry slice data may be referred to as geometry data unit data. According to embodiments, the geometry slice header (or geometry data unit header) may include identification information (geom_parameter_set_id) related to a parameter set included in a geometry parameter set (GPS), a tile identifier (geom_tile_id), a slice identifier (geom_slice_id), and information (geomBoxOrigin, geom_box_log 2_scale, geom_max_node_size_log 2, geom_num_points) about data included in the geometry slice data (geom_slice_data). geomBoxOrigin is geometry box origin information indicating the box origin of the geometry slice data, geom_box_log 2_scale is information indicating a log scale of the geometry slice data. geom_max_node_size_log 2 is information indicating the size of the root geometry octree node, and geom_num_points is information related to the number of points of the geometry slice data. The geometry slice data (or geometry data unit data) may include geometry information (or geometry data) related to the point cloud data in a corresponding slice.

Each attribute bitstream in each slice may include an attribute slice header (attr_slice_header) and attribute slice data (attr_slice_data). According to embodiments, the attribute bitstream in each slice may be referred to as an attribute data unit. Also, the attribute slice header may be referred to as an attribute data unit header, and the attribute slice data may be referred to as attribute data unit data. According to embodiments, the attribute slice header (or attribute data unit header) may include information about the corresponding attribute slice data (or corresponding attribute data unit), and the attribute slice data may include attribute information (also referred to as attribute data or attribute value) related to the point cloud data in the corresponding slice. When a plurality of attribute bitstreams is present in one slice, each attribute bitstream may include different attribute information. For example, one attribute bitstream may include attribute information corresponding to color, and another attribute stream may include attribute information corresponding to reflectance.

According to embodiments, parameters required for encoding and/or decoding of point cloud data may be defined in parameter sets of point cloud data (e.g., SPS, GPS, APS, and TPS (also referred to as a tile inventory)) and/or a header of the corresponding slice. For example, in encoding and/or decoding of geometry information, the parameters may be added to the GPS. In tile-based encoding and/or decoding, the parameters may be added to a tile and/or slice header.

According to embodiments, the geometry compression related information may be signaled in the SPS and/or TPS.

According to embodiments, geometry compression related information may be signaled in at least one of a geometry parameter set, a geometry slice header (also referred to as a geometry data unit header), or geometry slice data (also referred to as geometry data unit data).

According to embodiments, geometry compression related information may be signaled in an attribute parameter set and/or an attribute slice header (also referred to as an attribute data unit header) so as to be associated with or be applied to an attribute coding method or applied to attribute coding.

According to embodiments, the geometry compression related information may include information for identifying a distribution of points included in the search window and PU and performing motion vector estimation for the remaining points, excluding points classified as outlier points in the identified distribution of points. In the present disclosure, it may be indicated through the SPS that the motion vector estimation has been performed considering the point distribution. In addition, all or part of the relevant information required to estimate the motion vector considering the point distribution may be transmitted in the SPS, or may be transmitted in the GPS, the geometry slice header (also referred to as the geometry data unit header), the SEI message, or the like, depending on the implementation method.

According to embodiments, when a syntax element defined below is applicable to a plurality of point cloud data streams as well as the current point cloud data stream, the geometry compression related information may be carried in a higher parameter set.

According to embodiments, the geometry compression related information may be defined in a corresponding position or a separate position depending on the application or the system, such a different application range, a different application method, and the like may be used. A field, which is a term used in syntaxes of the present disclosure described below, may have the same meaning as a parameter or a syntax element.

According to embodiments, parameters (which may be referred to metadata, signaling information, or the like) containing the geometry compression related information may be generated by a metadata processor (or metadata generator) or signaling processor of a transmission device, and may be delivered to a reception device so as to be used in a decoding/reconstruction process. For example, a parameter generated and transmitted by the transmission device may be acquired by a metadata parser of the reception device.

FIG. 21 shows an embodiment of a syntax structure of a sequence parameter set (seq_parameter_set( )) (SPS). The SPS may contain sequence information about the point cloud data bitstream.

The SPS of FIG. 21 may contain a field distribute_MEMC_enable.

The field distribute_MEMC_enable is a flag to indicate whether to perform motion vector estimation in consideration of the distribution of points included in the motion vector estimation units (e.g., PU and search window) in performing motion vector estimation and motion vector compensation (ME/MC). When the value of distribute_MEMC_Enable is TRUE, it indicates that the ME considering the point distribution is applied. When the value is FALSE, it indicates that the ME/MC is performed using a search pattern.

In other words, FIG. 21 shows an example where geometry compression related information (or referred to as distribution reflecting ME/MC information) is added to the SPS and signaled.

FIG. 22 shows an example of a syntax structure of a geometry parameter set (geometry_parameter_set( )) (GPS) according to an embodiment of the present disclosure. The GPS may contain information about a method of encoding geometry information related to the point cloud data contained in one or more slices.

The GPS according to the embodiments may include a field geom_tree_type. The field geom_tree_type indicates whether the position information (i.e., geometry information) is encoded using an octree or a predictive tree. For example, geom_tree_type equal to 0 indicates that the position information (i.e., geometry information) is encoded using an octree, while geom_tree_type equal to 1 indicates that the position information (i.e., geometry information) is encoded using a predictive tree.

When geom_tree_type is equal to 0, indicating that the position information (i.e., geometry information) is encoded using an octree, the GPS according to the embodiments may further contain a field gps_Distribute_MEMC_enable.

The field gps_Distribute_MEMC_enable is a flag to indicate whether to perform motion vector estimation in consideration of the distribution of points included in the motion vector estimation units (e.g., PU and search window) in performing ME/MC. According to embodiments, it may be declared in the GPS so as to be signaled on a frame-by-frame basis.

When the value of gps_Distribute_MEMC_enable is TRUE, it indicates that the ME considering the point distribution is applied. When the value is FALSE, it indicates that the ME/MC is performed using a search pattern.

According to embodiments, if the field (i.e., flag) distribute_MEMC_enable is present in the SPS, the field gps_Distribute_MEMC_enable may be signaled with the corresponding information. If the field is not present in the SPS, whether to apply the field gps_Distribute_MEMC_enable may be signaled differently on a per-GPS basis.

When the value of the field gps_Distribute_MEMC_enable is TRUE, the GPS may further contain the fields Anchor_Cal_Method and gps_RefFrame_Threshold.

The field Anchor_Cal_Method indicates how the reference value is calculated in classifying (or selecting) points on which the motion vector estimation is to be performed. For example, Anchor_Cal_Method equal to 1 may indicate that the mean is used (or calculated) as the reference value, and Anchor_Cal_Method equal to 2 may indicate that the median is used (or calculated) as the reference value. Anchor_Cal_Method equal to 3 may indicate that the center coordinates of each of the search window and the PU are used (or calculated) as the reference value. In addition, a value of the field Anchor_Cal_Method may be added to indicate a method for deriving a value that may represent the region or represent the points included in the region.

When the value of the field gps_Distribute_MEMC_enable is TRUE, the field gps_RefFrame_Threshold indicates reference information, i.e., threshold information, for classifying points to be used for motion vector estimation among the candidate points included in the search window of the reference frame. For example, when the value of the field Anchor_Cal_Method indicates mean, the standard deviation is set as the reference information. When the value of the field Anchor_Cal_Method indicates median, the IQR is set as the reference information. In one embodiment, the exclusion of point(s) that are outside a specific range from the reference value from the selected candidates is performed based on the standard deviation when the reference value is the mean, or based on the IQR when the reference value is the median.

For example, when the standard deviation is set as the reference, and only points within the range of mean±2σ are considered for motion vector estimation, the value of the field gps_RefFrame_Threshold may be 2. When the value of the Anchor_Cal_Method field indicates Median, the IQR may be set as the reference and the range may be Median±IQR. Alternatively, any % value may be received to set the range. For example, a range of ±20% of the median or mean may be set to perform the motion vector estimation with only points in the range.

FIG. 22 shows an example where geometry compression related information (or referred to as distribution reflecting ME/MC information) is added to the GPS and signaled.

FIG. 23 shows an example syntax structure of a geometry data unit (geometry_data_unit( )) according to embodiments.

The geometry_data_unit( ) according to the embodiments may include a geometry data unit header (geometry_data_unit_header( )) and may include geometry octree data (geometry_octree( )) or geometry predictive tree data (geometry_predtree_data( )).

For example, when the value of the field geom_tree_type included in the GPS is 0, the geometry_data_unit( ) contains geometry octree data (geometry_octree( )). When the value of the field geom_tree_type included in the GPS is 1, the geometry_data_unit( ) contains geometry predictive tree data (geometry_predtree_data( )).

FIG. 24 shows an example syntax structure of a geometry data unit header (geometry_data_unit_header( )) according to embodiments. The geometry data unit header is used interchangeably with the geometry slice header.

In FIG. 24, gsh_geometr_parameter_set_id specifies the value of the gps_geom_parameter_set_id of the active GPS.

The field gsh_tile_id identifies a tile referenced by the geometry data unit header.

The field gsh_slice_id identifies the slice header for reference by other syntax elements.

The field slice_tag may be used to identify one or more slices having a specific value of slice_tag.

The field frame_ctr_lsb indicates the least significant bits (LSB) of a notional frame number counter.

The geometry data unit header according to the embodiments further includes a field gsh_entropy_continuation_flag when the value of an entropy_continuation_enabled_flag field is FALSE, and further includes a field gsh_prev_slice_id when the value of the gsh_entropy_continuation_flag field is TRUE.

The field entropy_continuation_enabled_flag may be included in the SPS. entropy_continuation_enabled_flag equal to 1 (i.e., true) indicates that a slice's initial entropy context state may depend upon the final entropy context state of the preceding slice. entropy_continuation_enabled_flag equal to 0 (i.e., false) indicates that the initial entropy context state of each slice is independent.

The field gsh_prev_slice_id specifies a value of the slice identifier (i.e., gsh_slice_id) of the preceding geometry data unit in bitstream order.

The geometry data unit header according to the embodiments may include a gsh_box_log 2_scale field when the value of gps_gsh_box_log 2_scale_present_flag is TRUE The field gps_gsh_box_log 2_scale_present_flag may be included in the GPS. gps_gsh_box_log 2_scale_present_flag equal to 1 indicates that the field gsh_box_log 2_scale is signaled in each geometry data unit that references the current GPS. gps_gsh_box_log 2_scale_present_flag field equal to 0 indicates that the field gsh_box_log 2_scale is not signaled in each geometry data unit and that a common scale for all slices is signaled in the field gps_gsh_box_log 2_scale of the current GPS.

The field gsh_box_log 2_scale indicates a scaling factor of a corresponding slice origin.

The geometry data unit header according to embodiments may include a field gsh_box_origin_bits_minus1.

The value of gsh_box_origin_bits_minus1 plus 1 indicates the length of gsh_box_origin_xyz[k] positioned next in bits.

The field gsh_box_origin_xyz[k] indicates a k-th component of the quantized coordinates (x, y, z) of the corresponding slice origin.

The geometry data unit header according to embodiments may include gsh_angular_origin_bits_minus1 and gsh_angular_origin_xyz[k] when the value of geom_slice_angular_origin_present_flag is TRUE.

The field geom_slice_angular_origin_present_flag may be included in the GPS. geom_slice_angular_origin_present_flag equal to 1 indicates that a slice relative angular origin is present in the corresponding geometry data unit header. geom_slice_angular_origin present_flag equal to 0 indicates that the angular origin is not present in the corresponding geometry data unit header.

gsh_angular_origin_bits_minus1 plus 1 indicates the length of the field gsh_angular_origin_xyz[ k] positioned next in bits.

The field gsh_angular_origin_xyz[k] indicates a k-th component of the coordinates (x, y, z) of the origin used in processing of an angular coding mode.

When the value of geom_tree_type is 0 (i.e., octree-based coding), the geometry data unit header according to embodiments may include a field geom_tree_depth_minus1 and a field gsh_entropy_stream_cnt_minus1.

geom_tree_depth_minus1 plus 1 indicates the number of geometry tree levels present in the data unit.

The gsh_entropy_stream_cnt_minus1 plus 1 indicates the maximum number of entropy streams used to convey geometry tree data.

When the value of geom_tree_type is 0 (i.e., octree-based coding) and the value of geom_tree_coded_axis_list_present_flag is TRUE, the geometry data unit header according to embodiments may include an iterative statement that iterates as many times as the value of geom_tree_depth_minus1. The iterative statement may include a field geom_tree_coded_axis_flag[ 1v1][ k].

The field geom_tree_coded_axis_list_present_flag may be included in the GPS. geom_tree_coded_axis_list_present_flag equal to 1 indicates that each geometry data unit includes a field geom_tree_coded_axis_flag used to derive a size of a geometry root node. geom_tree_coded_axis_list_present_flag equal to 0 indicates that the field geom_tree_coded_axis_flag is not present in the corresponding geometry data unit, and the coded geometry tree is a cubic volume.

The field geom_tree_coded_axis_flag[ 1v1][ k] indicates whether a k-th axis is coded at a v-th level (i.e., a given depth) of a geometry tree. The field geom_tree_coded_axis_flag[ 1v1][ k] may be used to determine the size of a root node.

The geometry data unit header according to embodiments may include a geom_slice_qp_offset field when the value of geom_scaling_enabled_flag is TRUE, and may further include a geom_qp_offset_intv1_log 2_delta field when the value of geom_tree_type is 1 (i.e., predictive tree-based coding).

The field geom_scaling_enabled_flag may be included in the GPS. geom_scaling_enabled_flag equal to 1 indicates that a scaling process for geometry positions is invoked during the geometry decoding. geom_scaling_enabled_flag equal to 0 indicates that geometry positions do not require scaling.

The geometry data unit header according to embodiments may include a field ptn_residual_abs_log 2_bits[ k] when the value of geom_tree_type is 1 (i.e., predictive tree-based coding), and may further include a field ptn_radius_min_value when the value of geometry_angular_enabled_flag is TRUE.

ptn_residual_abs_log 2_bits[ k] indicates the number of bins used to code a k-th component of the field ptn_residual_abs_log 2. The field ptn_residual_abs_log 2 will be described later.

The field geometry_angular_enabled_flag may be included in the GPS. geometry_angular_enabled_flag equal to 1 indicates that the angular coding mode is active. geometry_angular_enabled_flag equal to 0 indicates that the angular coding mode is not active.

The field ptn_radius_min_value indicates the minimum value of a radius.

FIG. 25 shows another example syntax structure of a geometry data unit header (geometry_data_unit_header( )) containing geometry compression related information according to embodiments.

According to embodiments, geometry_data_unit_header( ) of FIG. 25 may further include a field gbh_Distribute_MEMC_enable.

The field gbh_Distribute_MEMC_enable is a flag to indicate whether to perform motion vector estimation in consideration of the distribution of points included in the motion vector estimation units (e.g., PU and search window) in performing ME/MC. According to embodiments, it may be declared in the geometry data unit header so as to be signaled on a slice-by-slice basis.

When the value of gbh_Distribute_MEMC_enable is TRUE, it indicates that the ME considering the point distribution is applied. When the value is FALSE, it indicates that the ME/MC is performed using a search pattern.

According to embodiments, if the field (i.e., flag) distribute_MEMC_enable is present in the SPS, the field gbh_Distribute_MEMC_enable may be signaled with the corresponding information. If the field (i.e., flag) distribute_MEMC_enable is not present in the SPS, the application status of the field gps_Distribute_MEMC_enable signaled differently on a per-GPS basis may be inherited and delivered, or may be set differently for each slice even when the value of the field gps_Distribute_MEMC_enable in the GPS is TRUE.

When the value of the field gbh_Distribute_MEMC_enable is TRUE, the geometry data unit header may further contain the fields Anchor_Cal_Method and gbh_RefFrame_Threshold.

The field Anchor_Cal_Method indicates how the reference value is calculated in classifying (or selecting) points on which the motion vector estimation is to be performed. For example, Anchor_Cal_Method equal to 1 may indicate that the mean is used (or calculated) as the reference value, and Anchor_Cal_Method equal to 2 may indicate that the median is used (or calculated) as the reference value. Anchor_Cal_Method equal to 3 may indicate that the center coordinates of each of the search window and the PU are used (or calculated) as the reference value. In addition, a value of the field Anchor_Cal_Method may be added to indicate a method for deriving a value that may represent the region or represent the points included in the region.

When the value of the field gbh_Distribute_MEMC_enable is TRUE, the field gbh_RefFrame_Threshold indicates reference information, i.e., threshold information, for classifying points to be used for motion vector estimation among the candidate points included in the search window of the reference frame. For example, when the value of the field Anchor_Cal_Method indicates mean, the standard deviation is set as the reference information. When the value of the field Anchor_Cal_Method indicates median, the IQR is set as the reference information. In one embodiment, the exclusion of point(s) that are outside a specific range from the reference value from the selected candidates is performed based on the standard deviation when the reference value is the mean, or based on the IQR when the reference value is the median.

For example, when the standard deviation is set as the reference, and only points within the range of mean±2σ are considered for motion vector estimation, the value of the field gps_RefFrame_Threshold may be 2. When the value of the Anchor_Cal_Method field indicates Median, the IQR may be set as the reference and the range may be Median±IQR. Alternatively, any % value may be received to set the range. For example, a range of ±20% of the median or mean may be set to perform the motion vector estimation with only points in the range.

FIG. 25 shows an example where geometry compression related information (also referred to as distribution-reflecting ME/MC information) is added to the geometry data unit header and set and signaled differently on a slice-by-slice basis.

According to embodiments, the geometry compression related information of FIG. 25 may be included at any position in the geometry data unit header of FIG. 24.

FIG. 26 is a diagram showing another example of a point cloud data reception device according to embodiments. The elements of the point cloud data reception device shown in FIG. 26 may be implemented by hardware, software, processors, and/or a combination thereof.

According to embodiments, the point cloud data reception device may include a reception processor 61001, a signaling processor 61002, the geometry decoder 61003, an attribute decoder 61004, and a post-processor 61005.

The reception processor 61001 may receive one bitstream or may receive each of a geometry bitstream, an attribute bitstream, and a signaling bitstream. Upon receiving a file and/or a segment, the reception processor 61001 may decapsulate the received file and/or segment and output a bitstream therefor.

When receiving (or decapsulating) one bitstream, the reception processor 61001 may demultiplex a geometry bitstream, an attribute bitstream, and/or a signaling bitstream from one bitstream, output the demultiplexed signaling bitstream to the signaling processor 61002, output the geometry bitstream to the geometry decoder 61003, and output the attribute bitstream to the attribute decoder 61004.

When receiving (or decapsulating) a geometry bitstream, an attribute bitstream, and/or a signaling bitstream, the reception processor 61001 may deliver the signaling bitstream to the signaling processor 61002, deliver the geometry bitstream to the geometry decoder 61003, and deliver the attribute bitstream to the attribute decoder 61004.

The signaling processor 61002 may parse and process information included in signaling information, e.g., SPS, GPS, APS, TPS, and metadata in the input signaling bitstream and provide the parsed and processed information to the geometry decoder 61003, the attribute decoder 61004, and the post-processor 61005. According to another embodiment, signaling information included in the geometry data unit header and/or the attribute data unit header may be pre-parsed by the signaling processor 61002 prior to decoding of corresponding slice data.

According to embodiments, the signaling processor 61002 may parse and process the signaling information (e.g., geometry compression related information) signaled in the geometry data unit and provide the parsed and processed information to the geometry decoder 61003.

According to embodiments, the geometry decoder 61003 may perform a reverse process of the geometry encoder 51003 of FIG. 16 based on signaling information on the compressed geometry bitstream to reconstruct geometry. According to embodiments, the geometry decoder 61003 may perform motion compensation in consideration of the distribution of points based on the geometry compression related information in reconstructing the geometry information.

The geometry information restored (or reconstructed) by the geometry decoder 61003 is provided to the attribute decoder 61004. The attribute decoder 61004 may restore an attribute by performing a reverse process of the attribute encoder 51004 of FIG. 16 based on signaling information and reconstructed geometry information for the compressed attribute bitstream.

According to embodiments, the post-processor 61005 may reconstruct point cloud data by matching geometry information (i.e., positions) restored and output from the geometry decoder 61003 with attribute information restored and output from the attribute decoder 61004 and display/render the reconstructed point cloud data.

Figure 27:
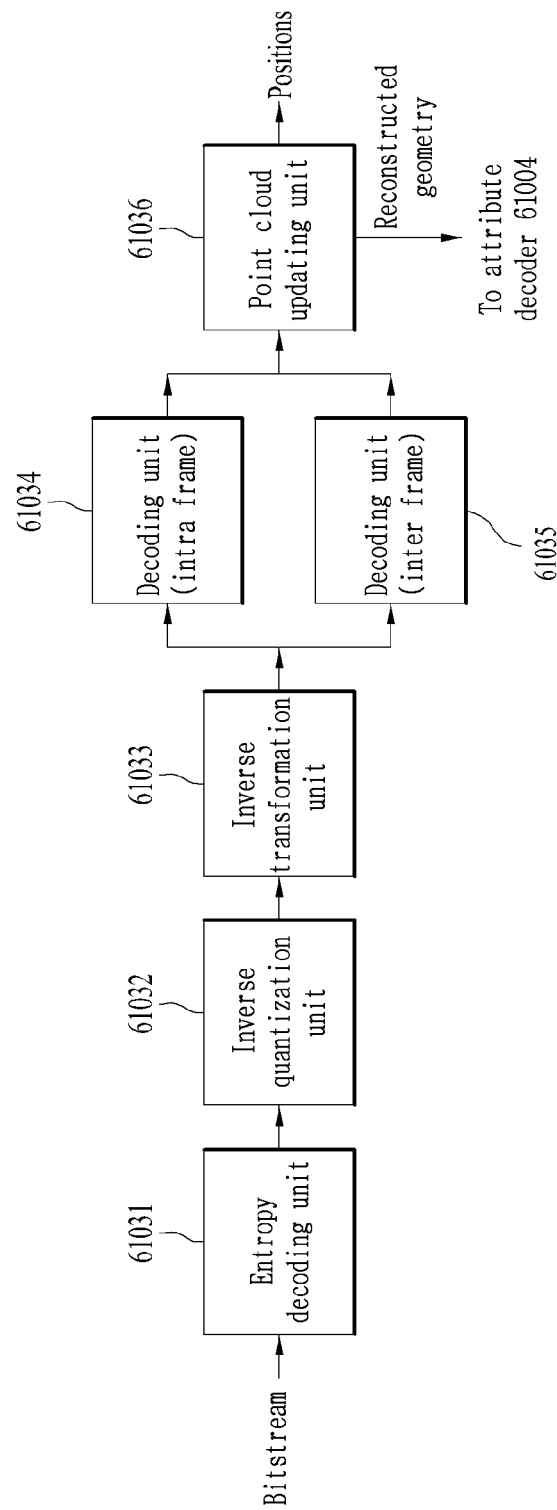
FIG. 27 is an example detailed block diagram of a geometry decoder according to embodiments.

FIG. 27 is an example detailed block diagram of the geometry decoder 61003 according to embodiments. FIG. 27 is an example detailed block diagram of a geometry decoder configured to reconstruct geometry information based on inter-frame correlation.

According to embodiments, the geometry decoder 61003 may include an entropy decoding unit 61031, an inverse quantization unit 61032, an inverse transformation unit 61033, a first decoding unit 61034, a second decoding unit 61035, and a point cloud updating unit 61036.

The elements of the geometry decoder illustrated in FIG. 27 may be implemented by hardware, software, processors, and/or combinations thereof. In FIG. 27, the order of execution of the respective blocks may change, some blocks may be omitted, and some new blocks may be added.

According to embodiments, once a bitstream is acquired by the reception processor 61001, the geometry compression related information (e.g., motion vector, reference frame Id, distribute_MEMC_enable, gps_Distribute_MEMC_enable, or gbh_Distribute_MEMC_enable) described with reference to FIGS. 20 to 25 may be acquired. For example, when the value of the field distribute_MEMC_enable in the SPS is TRUE, it indicates that motion vector estimation is performed for all points considering the distribution of points. When the value of the field gps_Distribute_MEMC_enable in the GPS is TRUE, it indicates that motion vector estimation is performed on a frame-by-frame basis considering the distribution of points. Also, when the value of the field gbh_Distribute_MEMC_enable in the geometry data unit header is TRUE, it indicates that motion vector estimation is performed on a slice-by-slice basis considering the distribution of points.

According to embodiments, the entropy decoding unit 61031 performs entropy decoding on the geometry information (e.g., residual information (i.e., prediction error) and prediction mode information related to each point per PU) included in the bitstream input via the reception processor 61001. Here, the prediction mode information may be the intra-prediction mode or inter-prediction mode, depending on whether the prediction is inter-frame prediction or intra-frame prediction.

The entropy decoded geometry information is inversely quantized by the inverse quantization unit 61032 in the reverse of a process on the transmission side, and is subjected to coordinate inverse transformation by the inverse transformation unit 61033 in the reverse of a process on the reception side.

If the frame is a frame for intra prediction, the first decoding unit 63004 applies the method for intra prediction to the inversely transformed geometry information, and the updating unit 61036 updates (or reconstructs) the geometry information to which the method for intra prediction has been applied.

If the frame is a frame for inter prediction, the second decoding unit 61035 applies the method for inter prediction to the inversely transformed geometry information based on the geometry compression related information, and the updating unit 61036 updates (or reconstructs) the geometry information to which the method for inter prediction has been applied. According to embodiments, the second decoding unit 61035 determines, based on flag information (e.g., at least one of distribute_MEMC_enable, gps_ Distribute_MEMC_enable, or gbh_Distribute_MEMC_enable) included in the geometry compression related information, whether the motion vector estimation has been performed on the transmission side considering the distribution of points.

For example, if the motion estimation has been performed considering the distribution of points, the second decoding unit 61035 classifies (or selects) the points to which the motion vector is to be applied based on the reference value information (e.g., Anchor_Cal_Method) and the threshold information (e.g., gbh_RefFrame_Threshold or gsp_RefFrame_Threshold) included in the geometry compression related information, and performs motion vector compensation. That is, based on the reference value information and threshold information, the outlier point(s) among the points included in the search window of the reference frame are removed and motion compensation is performed. For example, from the field Anchor_Cal_Method, it may be determined whether the reference value is the mean, median, or other value. The field gbh_RefFrame_Threshold (or the field gsp_RefFrame_Threshold) indicates reference information, i.e., threshold information, for classifying the points to be used for motion vector estimation among the candidate points included in the search window of the reference frame. For example, when the value of the field Anchor_Cal_Method indicates mean, the standard deviation is set as the reference information. When the value of the field Anchor_Cal_Method indicates median, the IQR is set as the reference information. According to embodiments, the exclusion of point(s) that are outside a specific range from the reference value from the selected candidates may be performed based on the standard deviation when the reference value is the mean, or based on the IQR when the reference value is the median.

In another example, if the motion estimation has been performed without considering the distribution of points, the motion vector compensation is performed based on the motion vector corresponding to the PU.

Once the motion vector compensation is performed by the second decoding unit 61035, the updating unit 61036 updates the geometry information.

According to embodiments, the geometry information reconstructed as predicted information for points in the PU range of the current frame based on the motion vector information delivered for each PU may be stored in a frame memory (or buffer) and used as predicted information for data within the PU range of the next frame.

Once the reconstruction of the geometry information is complete according to embodiments, the attribute decoder 61004 inversely transforms the color information in order to include attribute information in the corresponding positions, and sends the reconstructed point cloud content to the renderer.

In other words, the geometry decoder as shown in FIG. 27 reconstructs the original point cloud with the residual information, which is a prediction error for each point, by entropy decoding, inverse quantization, inverse transformation, and inter-prediction on the received bitstream.

Figure 28:
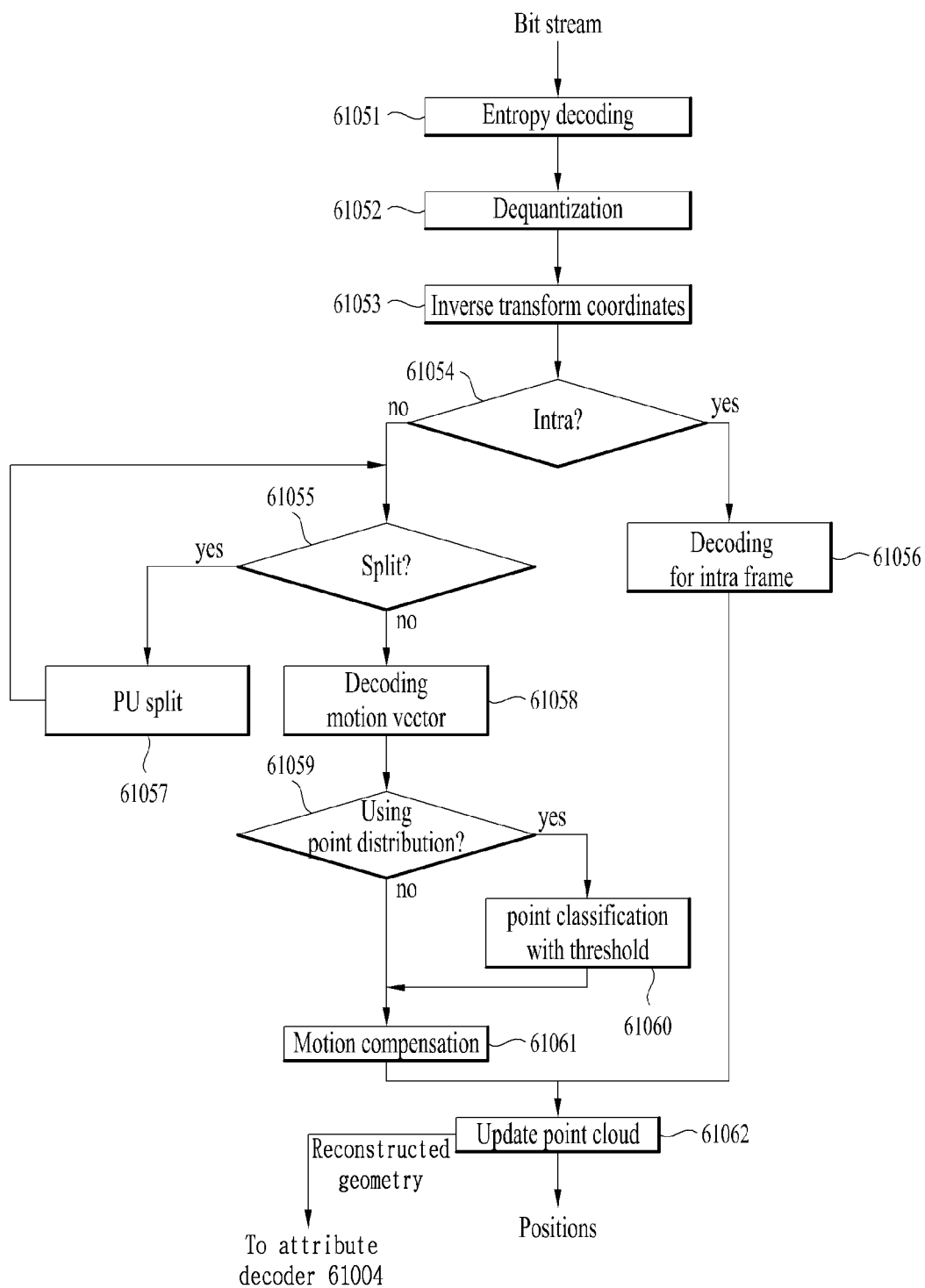
FIG. 28 is a flowchart illustrating an example of a geometry decoding method according to embodiments.

FIG. 28 is a flowchart illustrating an example geometry decoding method for reconstructing compressed geometry based on inter-frame correlation according to embodiments. The operations shown in FIG. 28 may be performed by a point cloud data reception device according to embodiments (e.g., the reception device of FIG. 1, the decoding of FIG. 2, the point cloud video decoder of FIG. 11, the reception device of FIG. 13, the geometry decoder of FIG. 26, or the geometry decoder of FIG. 27), or a combination thereof. The elements of the point cloud data reception device according to the embodiments may be configured by hardware, software, processors, and/or combinations thereof.

According to embodiments, the geometry information (e.g., residual information (i.e., prediction error) and prediction mode information for each point per PU) contained in the geometry bitstream input through the reception processor 61001 is entropy decoded (operation 61051).

The entropy decoded geometry information is inversely quantized in the reverse of a process on the transmission side (operation 61052), and the inversely quantized geometry information is subjected to coordinate inverse transformation in the reverse of a process on the transmission side (operation 61053).

It is determined whether the current frame including the geometry information processed through the coordinate inverse transformation is a frame for intra prediction or inter prediction (operation 61054). Here, the determination of whether the current frame is a frame for intra prediction or inter prediction may be determined based on flag information. In one embodiment, the flag information is included in the geometry compression related information. In one embodiment, the geometry compression related information is included in at least one of SPS, GPS, TPS, or a geometry data unit (e.g., a geometry data unit header).

When the current frame containing the geometry information processed through the coordinate inverse transformation is a frame for intra prediction, motion compensation is performed by applying the signaling information and a method for intra prediction (operation 61056). Then, the geometry information is updated (operation 61062). The updated geometry information (positions) is output to the post-processor 61005, which includes a renderer. Further, the reconstructed geometry information is provided to the attribute decoder 61004 for attribute decoding.

When it is determined that the current frame containing the geometry information processed through the coordinate inverse transformation is a frame for inter prediction, it is checked whether the PU in the current frame is a PU that needs to be split (operation 61055). If the PU needs to be split, the process proceeds to operation 61057 to additionally split the PU into sub-PUs and then check if additional splits have been performed for each sub-PU. In one embodiment, the split status is checked using flag information (e.g., split flag).

Once the splitting is complete in operation 61055, the motion vector of the PU is decoded (operation 61058).

Then, based on the flag information (e.g., at least one of distribute_MEMC_enable, gps_Distribute_MEMC_enable, or gbh_Distribute_MEMC_enable) included in the geometry compression related information, it is checked whether the motion vector estimation has been performed on the transmission side considering the distribution of points.

For example, if the motion estimation has been performed considering the distribution of points, the points to which the motion vector is to be applied are classified (or selected) based on the reference value information (e.g., Anchor_Cal_Method) and the threshold information (e.g., gbh_RefFrame_Threshold or gsp_RefFrame_Threshold) included in the geometry compression related information, and performs motion vector compensation (operation 61061). That is, in operation 61061, based on the reference value information and threshold information, the outlier point(s) among the points included in the search window of the reference frame are removed and motion compensation is performed. For example, from the field Anchor_Cal_Method, it may be determined whether the reference value is the mean, median, or other value. The field gbh_RefFrame_Threshold (or the field gsp_RefFrame_Threshold) indicates reference information, i.e., threshold information, for classifying the points to be used for motion vector estimation among the candidate points included in the search window of the reference frame. For example, when the value of the field Anchor_Cal_Method indicates mean, the standard deviation is set as the reference information. When the value of the field Anchor_Cal_Method indicates median, the IQR is set as the reference information.

In another example, if the motion estimation has been performed without considering the distribution of points, the motion vector compensation is performed based on the motion vector corresponding to the PU (operation 61061).

Once the motion vector compensation is performed in operation 61061, the geometry information is updated (operation 61062). The updated geometry information (positions) is transmitted to the post-processor 61005, and the reconstructed geometry information is output to the attribute decoder 61004 for attribute decoding.

According to embodiments, the geometry information reconstructed as predicted information for points in the PU range of the current frame based on the motion vector information delivered for each PU may be stored in a frame memory (or buffer) and used as predicted information for data within the PU range of the next frame.

Once the reconstruction of the geometry information is complete according to embodiments, the attribute decoder 61004 inversely transforms the color information in order to include attribute information in the corresponding positions, and sends the reconstructed point cloud content to the renderer of the post-processor 61005.

In other words, in the operation of geometry decoding as shown in FIG. 28, the original point cloud is reconstructed with the residual information, which is a prediction error for each point, by entropy decoding, inverse quantization, inverse transformation, and inter-prediction on the received bitstream.

As described above, the present disclosure proposes a method for considering a distribution of points that are the targets of the prediction for inter-frame motion prediction of point cloud content. More specifically, the encoder of the transmission device may check the distribution of points included in each of the PU and the search window; and perform motion vector estimation and compensation by excluding point(s) outside a specific range from positions (i.e., referred to as reference values, reference position information, or anchor position information) representing the PU and the search window (i.e., points that are excessively far apart and may reduce the accuracy of the motion vector estimation) (i.e., by removing outliers), thereby improving the accuracy of the prediction and reducing the complexity compared to a method using search patterns. Furthermore, the decoder of the reception device may receive a criterion for excluding outlier points, remove the outlier point(s) among the points included in the search window of the reference frame, and perform motion compensation, thereby improving accuracy.

Also, the compression (i.e., the transmission device) and reconstruction (i.e., the reception device) of the geometry information based on similarity between frames described in the present disclosure may be used for compression and reconstruction of the point cloud data.

The aforementioned operation according to embodiments may be performed through components of the point cloud transmitting and reception device/method including a memory and/or a processor. The memory may store programs for processing/controlling operations according to embodiments. Each element of the point cloud transmission and reception device/method according to embodiments may correspond to hardware, software, a processor, and/or a combination thereof. The processor may control the various operations described in the present disclosure. The processor may be referred to as a controller or the like. The operations according to embodiments may be performed by firmware, software, and/or a combination thereof, wherein the firmware, software, and/or combination thereof may be stored in the processor or the memory. In the present embodiment, the method of compressing geometry information of point cloud data has been described, but the method described in the disclosure may be applied to attribute information compression and other compression methods.

Each part, module, or unit described above may be a software, processor, or hardware part that executes successive procedures stored in a memory (or storage unit). Each of the steps described in the above embodiments may be performed by a processor, software, or hardware parts. Each module/block/unit described in the above embodiments may operate as a processor, software, or hardware. In addition, the methods presented by the embodiments may be executed as code. This code may be written on a processor readable storage medium and thus read by a processor provided by an apparatus.

In the specification, when a part "comprises" or "includes" an element, it means that the part further comprises or includes another element unless otherwise mentioned. Also, the term " . . . module (or unit)" disclosed in the specification means a unit for processing at least one function or operation, and may be implemented by hardware, software or combination of hardware and software.

Although embodiments have been explained with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may fall within the scope of the appended claims and their equivalents.

The apparatuses and methods may not be limited by the configurations and methods of the embodiments described above. The embodiments described above may be configured by being selectively combined with one another entirely or in part to enable various modifications.

Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the apparatuses of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the apparatus according to the embodiments may include one or more processors capable of executing one or more programs. The one or more programs may perform any one or more of the operations/methods according to the embodiments or include instructions for performing the same. Executable instructions for performing the method/operations of the apparatus according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also non-volatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A. 2) only B, and/or 3) both A and B. In other words, the term "or" in this document should be interpreted as "additionally or alternatively."

Various elements of the embodiments may be implemented by hardware, software, firmware, or a combination thereof. Various elements in the embodiments may be executed by a single chip such as a single hardware circuit. According to embodiments, the element may be selectively executed by separate chips, respectively. According to embodiments, at least one of the elements of the embodiments may be executed in one or more processors including instructions for performing operations according to the embodiments.

Operations according to the embodiments described in this specification may be performed by a transmission/reception device including one or more memories and/or one or more processors according to embodiments. The one or more memories may store programs for processing/controlling the operations according to the embodiments, and the one or more processors may control various operations described in this specification. The one or more processors may be referred to as a controller or the like. In embodiments, operations may be performed by firmware, software, and/or combinations thereof. The firmware, software, and/or combinations thereof may be stored in the processor or the memory.

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Additionally, the operations according to the embodiments described in this document may be performed by transmitting and receiving devices, each of which includes a memory and/or processor, depending on the embodiments. The memory may store programs for processing and controlling the operations according to the embodiments, and the processor may control various operations described in this document. The processor may be referred to as a controller or the like. The operations according to the embodiments may be implemented by firmware, software, and/or combinations thereof, and the firmware, software, and/or combinations thereof may be stored in the processor or memory.

Mode for Disclosure

The details have been specifically described in the best mode for the disclosure.

INDUSTRIAL APPLICABILITY

It will be apparent to those skilled in the art that various modifications and variations are possible without departing from the spirit or scope of the embodiments. Thus, it is intended that the embodiments cover the modifications and variations of the embodiments provided they come within the appended claims and their equivalents.

The invention claimed is:

1. A method of transmitting point cloud data, the method comprising:
    encoding geometry data containing positions of points of the point cloud data;
    encoding attribute data containing attribute values of the points of the point cloud data based on the geometry data; and
    transmitting the encoded geometry data, the encoded attribute data, and signaling information,
    wherein the encoding of the geometry data comprises compressing the geometry data by performing motion estimation based on points selected in a search window of a reference frame and points selected in a prediction unit to be encoded of a current frame,
    wherein the signaling information includes geometry compression related information, and
    wherein the geometry compression related information includes at least motion vector information or information for point selection.

2. The method of claim 1, wherein the encoding of the geometry data comprises:
    acquiring first reference position information based on points included in the prediction unit to be encoded of the current frame;

selecting, based on the first reference position information, first points for motion estimation from among points included in the prediction unit;

acquiring second reference position information based on points included in the search window of the reference frame;

selecting, based on the second reference position information, second points for motion estimation from among the points included in the search window;

estimating a motion vector based on the first points and the second points; and performing motion compensation based on the motion vector.

3. The method of claim 2, wherein the first reference position information is a mean of the points included in the prediction unit, and wherein the second reference position information is a mean of the points included in the search window.

4. The method of claim 2, wherein the first reference position information is a median of the points included in the prediction unit, and wherein the second reference position information is a median of the points included in the search window.

5. The method of claim 2, wherein the selecting of the first points selects, from among the points included in the prediction unit, points within a first range from the first reference position information as the first points, wherein the selecting of the second points selects, from among the points included in the search window, points within a second range from the second reference position information as the second points.

6. The method of claim 2, wherein the estimating of the motion vector comprises:

acquiring first representative position information based on the first points;

acquiring second representative position information based on the second points; and estimating a difference between the first representative position information and the second representative position information as the motion vector.

7. A device for transmitting point cloud data, the device comprising:

a geometry encoder configured to encode geometry data containing positions of points of point cloud data;

an attribute encoder configured to encode attribute data containing attribute values of the points of the point cloud data based on the geometry data; and a transmitter configured to transmit the encoded geometry data, the encoded attribute data, and signaling information, wherein the geometry encoder compresses the geometry data by performing motion estimation based on points selected in a search window of a reference frame and points selected in a prediction unit to be encoded of a current frame, wherein the signaling information includes geometry compression related information, and wherein the geometry compression related information includes at least motion vector information or information for point selection.

8. The device of claim 7, wherein the geometry encoder comprises:

a first reference position information acquirer configured to acquire first reference position information based on points included in the prediction unit to be encoded of the current frame;

a first selector configured to select, based on the first reference position information, first points for motion estimation from among points included in the prediction unit;

a second reference position information acquirer configured to acquire second reference position information based on points included in a search window of the reference frame;

a second selector configured to select, based on the second reference position information, second points for motion estimation from among the points included in the search window;

a motion estimator configured to estimate a motion vector based on the first points and the second points; and a motion compensator configured to perform motion compensation based on the motion vector.

9. The device of claim 8, wherein the first reference position information is a mean of the points included in the prediction unit, and wherein the second reference position information is a mean of the points included in the search window.

10. The device of claim 8, wherein the first reference position information is a median of the points included in the prediction unit, and wherein the second reference position information is a median of the points included in the search window.

11. The device of claim 8, wherein the first selector selects, from among the points included in the prediction unit, points within a first range from the first reference position information as the first points, wherein the second selector selects, from among the points included in the search window, points within a second range from the second reference position information as the second points.

12. The device of claim 8, wherein the motion estimator is configured to:

acquire first representative position information based on the first points;

acquire second representative position information based on the second points; and estimate a difference between the first representative position information and the second representative position information as the motion vector.

13. A method of receiving point cloud data, the method comprising:

receiving geometry data, and signaling information;

decoding the geometry data based on the signaling information; and decoding the attribute data based on the signaling information and the decoded geometry data, wherein the decoded geometry data includes positions of points for the point cloud data and the decoded attribute data includes attribute values of the points, wherein the decoding of the geometry data comprises:

selecting points for motion compensation from among points included in a search window of a reference frame based on the signaling information, and performing motion compensation based on points included in a prediction unit to be decoded of a current frame and the selected points in the search window, wherein the signaling information includes geometry compression related information, and wherein the geometry compression related information includes at least motion vector information or information for point selection.

* * * * *